United States Patent
Sato

(10) Patent No.: US 9,167,267 B2
(45) Date of Patent: Oct. 20, 2015

(54) IMAGE PROCESSING DEVICE AND IMAGE PROCESSING METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/464,157

(22) Filed: Aug. 20, 2014

(65) Prior Publication Data

US 2014/0355670 A1 Dec. 4, 2014

Related U.S. Application Data

(63) Continuation of application No. 13/640,243, filed as application No. PCT/JP2011/061288 on May 17, 2011, now Pat. No. 8,855,434.

(30) Foreign Application Priority Data

May 18, 2010 (JP) .................................. 2010-114067

(51) Int. Cl.
*G06K 9/36* (2006.01)
*H04N 19/60* (2014.01)
(Continued)

(52) U.S. Cl.
CPC .............. *H04N 19/60* (2014.11); *H04N 19/117* (2014.11); *H04N 19/157* (2014.11); *H04N 19/176* (2014.11); *H04N 19/80* (2014.11); *H04N 19/86* (2014.11)

(58) Field of Classification Search
USPC ......... 382/232, 233, 236, 239, 240, 294, 260, 382/276; 375/240.19, 240.29, E7.027, 375/E7.048, E7.051, 265, 326, 341; 348/725, E11.002, E5.077
See application file for complete search history.

(56) References Cited

U.S. PATENT DOCUMENTS 6,968,086 B1 * 11/2005 Fukuhara et al. .............. 382/233
7,016,546 B2 * 3/2006 Fukuhara et al. .............. 382/239
(Continued)

FOREIGN PATENT DOCUMENTS

JP 2005-123732 5/2005
JP 2006-521065 9/2006
(Continued)

OTHER PUBLICATIONS

International Search Report Issued Aug. 16, 2011 in PCT/JP11/61288 Filed May 17, 2011.
(Continued)

*Primary Examiner* — Anh Do
(74) *Attorney, Agent, or Firm* — Oblon, McClelland, Maier & Neustadt, L.L.P.

(57) ABSTRACT

A deblocking filter performs filtering of decoded image data obtained by decoding image data encoded for each block, so as to remove block distortion. If at least one of block sizes on adjacent sides of two adjacent blocks is extended larger than a predetermined block size, a filter setting unit sets the tap length to an extended length to increase the strength of distortion removal, or sets a filtering object pixel range to an extended range. When a macroblock having an extended size is used, the degree of smoothing is increased, and pixels including those distant from the block boundary are subjected to filtering. Consequently, even when various block sizes are employed or when blocks of extended sizes are used, images of high image quality can be achieved.

18 Claims, 15 Drawing Sheets

(51) Int. Cl.
*H04N 19/176* (2014.01)
*H04N 19/117* (2014.01)
*H04N 19/157* (2014.01)
*H04N 19/86* (2014.01)
*H04N 19/80* (2014.01)

(56) References Cited

U.S. PATENT DOCUMENTS

| | | | |
|---|---|---|---|
| 7,298,910 B2 * | 11/2007 | Fukuhara et al. | 382/233 |
| 7,330,596 B2 * | 2/2008 | Suino et al. | 382/240 |
| 7,454,075 B2 * | 11/2008 | Fukuhara et al. | 382/240 |
| 7,522,778 B2 * | 4/2009 | Suino et al. | 382/240 |
| 8,509,316 B2 * | 8/2013 | Rusanovskyy et al. | 375/240.29 |
| 2004/0208392 A1 | 10/2004 | Raveendran et al. | 382/248 |
| 2005/0078750 A1 | 4/2005 | Shen et al. | 375/240.29 |
| 2010/0080472 A1 | 4/2010 | Asano | 382/260 |
| 2010/0135389 A1 | 6/2010 | Tanizawa et al. | 375/240.29 |
| 2012/0321206 A1 | 12/2012 | Sato | 382/233 |

FOREIGN PATENT DOCUMENTS

| | | |
|---|---|---|
| JP | 2007-36463 A | 2/2007 |
| JP | 2010-81368 | 4/2010 |
| JP | 2010-81368 A | 4/2010 |
| WO | 2009-001793 | 12/2008 |
| WO | 2010-001911 | 1/2010 |

OTHER PUBLICATIONS

Peisong Chenn, et al., "Video Coding Using Extended Block Sizes", Qualcomm Inc., International Telecommunication Union, Study Group 16-Contribution 123, Jan. 2009, pp. 1-4.
U.S. Appl. No. 14/464,133, filed Aug. 20, 2014, Sato.
Office Action issued on Jan. 13, 2015 in the corresponding Japanese Patent Application No. 2012-515888.
Office Action issued Mar. 31, 2015 in Japanese Patent Application No. 2012-515888.
Office Action issued on Jun. 30, 2015 in Japanese Patent Application No. 2012-515888.

* cited by examiner

F I G . 4
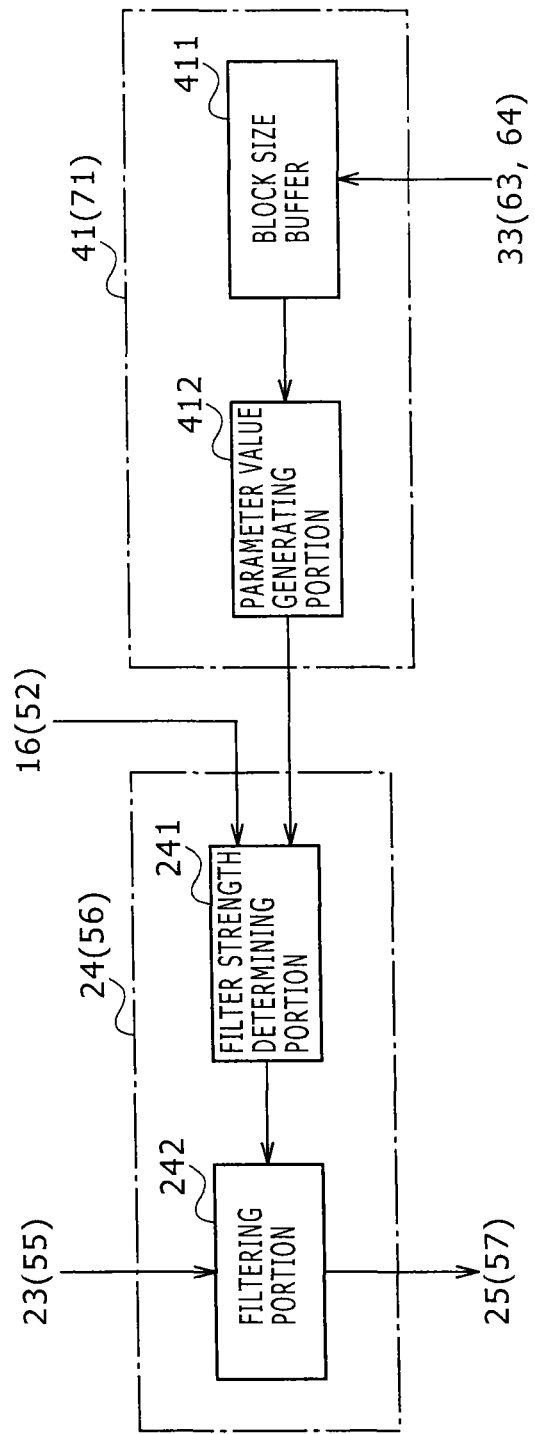

IMAGE PROCESSING DEVICE AND IMAGE PROCESSING METHOD

CROSS-REFERENCE TO RELATED APPLICATIONS

This application is a continuation of U.S. Ser. No. 13/640,243 filed Oct. 9, 2012, now U.S. Pat. No. 8,855,434, the entire content of which is incorporated herein by reference, and claims the benefit of priority from, PCT Application No. PCT/JP11/061,288 filed May 17, 2011, and is further based upon, and claims the benefit of priority under 35 U.S.C. §119 from, Japanese Patent Application No. 2010-114067 filed May 18, 2010.

TECHNICAL FIELD

The present technology relates to an image processing device and an image processing method, and particularly makes it possible to obtain a decoded image of excellent image quality.

BACKGROUND ART

In recent years, devices that treat image information as digital and transmit or store the information with high efficiency, or for example devices complying with systems of MPEG and the like in which compression is performed by an orthogonal transform such as a discrete cosine transform and motion compensation, have been spreading in broadcasting stations and ordinary households.

MPEG2 (ISO/IEC 13818-2), in particular, is defined as a general-purpose image coding system, and is now used widely in a wide range of applications for professional use and consumer use. The use of this MPEG2 compression system can achieve excellent image quality by assigning an amount of code (bit rate) of four to eight Mbps in a case of an interlaced image of a standard resolution with 720×480 pixels, for example. Excellent image quality can also be achieved by assigning an amount of code (bit rate) of 18 to 22 Mbps in a case of an interlaced image of a high resolution with 1920×1088 pixels.

MPEG2 was intended for high-image-quality coding to be adapted mainly for broadcasting, and did not make provisions for a coding system with a lower amount of code (bit rate), that is, a higher compression ratio than MPEG1. With the spread of portable terminals, a need for such a coding system is expected to increase in the future. Accordingly, an MPEG4 coding system was standardized. A standard for an image coding system was approved as an international standard of ISO/IEC 14496-2 in December 1998.

Further, standardization of a standard referred to as H.26L (ITU-T Q6/16 VCEG) has recently been under way with an original objective of image coding for videoconferences. It is known that H.26L requires a larger amount of operation for coding and decoding but achieves a higher coding efficiency compared to conventional coding systems such as MPEG2, MPEG4, and the like. In addition, as part of activities of MPEG4, standardization for achieving higher coding efficiency on the basis of this H.26L is now under way as Joint Model of Enhanced-Compression Video Coding. As for a standardization schedule, an international standard was established under a name of H.264 and MPEG-4 Part 10 (Advanced Video Coding, hereinafter written as "H.264/AVC") in March 2003.

Further, as an extension thereof, standardization of FRExt (Fidelity Range Extension) including coding tools necessary for business use such as RGB, 4:2:2 and 4:4:4 as well as an 8×8 DCT and a quantization matrix defined in MPEG2 was completed in February 2005. Thereby, the H.264/AVC system is used as a coding system capable of excellently representing even film noise included in movies, and is used in a wide range of applications such as Blu-Ray (registered trademark).

In such a coding and decoding process, image data is coded in block units. In addition, in decoding coded data, as shown in Patent Document 1, for example, block distortion is suppressed by performing filtering on the basis of a block boundary strength and a quantization parameter.

Further, there have recently been increasing needs for coding with a still higher compression ratio, such as a desire to compress images of about 4000×2000 pixels or a desire to distribute high-definition images in an environment with a limited transmission capacity such as the Internet. Thus, as in Non-Patent Document 1, setting a macroblock size to a size larger than that of MPEG2 or H.264/AVC, for example a size of 32 pixels×32 pixels, is proposed. Specifically, in Non-Patent Document 1, a hierarchical structure is adopted for macroblocks, whereby compatibility with macroblocks in H.264/AVC is maintained for 16×16 pixel blocks and smaller blocks, and larger blocks are defined as a superset thereof.

PRIOR ART DOCUMENTS

Patent Document

Patent Document 1: Japanese Patent Laid-Open No. 2007-36463

Non-Patent Document

Non-Patent Document 1: "Video Coding Using Extended Block" (Study Group 16, Contribution 123, ITU, January 2009)

SUMMARY OF INVENTION

Technical Problem

Incidentally, when block distortion is removed by a conventional deblocking filter, the block distortion may be increased at a low bit rate in particular, so that there is a fear of the block distortion not being removed sufficiently and image quality being degraded.

It is accordingly an object of the present technology to provide an image processing device and an image processing method that can provide an image of excellent image quality even when various block sizes are used or when a block of an extended size is used.

Technical Solutions

According to a first aspect of the present technology, there is provided an image processing device including: a decoding section for decoding image data coded in each block; a filter for applying filtering for removing block distortion to the decoded image data decoded by the decoding section; and a filter setting section for setting, according to block sizes of adjacent blocks adjacent at a block boundary, a tap length of the filtering for the block boundary or a filtering object pixel range as an object of the filtering.

In the present technology, a filter for applying filtering for removing block distortion to decoded image data obtained by decoding image data coded in each block and a filter-setting section for setting the filter are provided. When at least one of adjacent blocks adjacent at a block boundary is extended larger than a predetermined block size, for example, the filter setting section sets the tap length of the filtering for the block boundary longer as the block size is increased or sets a filtering object pixel range as an object of the filtering wider as the block size is increased. In addition, the tap length of the filtering or the filtering object pixel range is set according to block sizes on adjacent sides of the adjacent blocks. In addition, case classification corresponding to the block sizes of the adjacent blocks is performed, and the tap length of the filtering and the filtering object pixel range are set according to a case where the adjacent blocks both have a predetermined block size or smaller and a case where at least one of the adjacent blocks is extended larger than the predetermined block size. The case classification is performed into for example a case where the adjacent blocks are 16×16 pixels or smaller, a case where at least one of the two blocks is larger than 16×16 pixels and both are 32×32 pixels or smaller, and a case where at least one of the two blocks is larger than 32×32 pixels. The block sizes are prediction block sizes as processing units when intra prediction or inter prediction is performed. Further, the filter setting section sets the tap length or the filtering object pixel range according to whether the decoded image data is image data for generating a predictive image or image data for image display.

According to a second aspect of the present technology, there is provided an image processing method including: a decoding step of decoding image data coded in each block; a filter step of applying filtering for removing block distortion to the decoded image data decoded in the decoding step; and a filter step of setting, according to block sizes of adjacent blocks adjacent at a block boundary, a tap length of the filtering for the block boundary or a filtering object pixel range as an object of the filtering.

According to a third aspect of the present technology, there is provided an image processing device including: a filter for applying filtering for removing block distortion to decoded image data obtained by locally decoding image data resulting from an orthogonal transform and quantization; a filter setting section for setting, according to block sizes of adjacent blocks adjacent at a block boundary, a tap length of the filtering for the block boundary or a filtering object pixel range as an object of the filtering; and a coding section for performing coding in each image data block using the decoded image data resulting from the filtering by the filter.

According to a fourth aspect of the present technology, there is provided an image processing method including: a filter step of applying filtering for removing block distortion to decoded image data obtained by locally decoding image data resulting from an orthogonal transform and quantization; a filter setting step of setting, according to block sizes of adjacent blocks adjacent at a block boundary, a tap length of the filtering for the block boundary or a filtering object pixel range as an object of the filtering; and a coding step of performing coding in each image data block using the decoded image data resulting from the filtering in the filter step.

Advantageous Effect

According to the present technology, an image of excellent image quality with a reduced block distortion can be obtained.

BRIEF DESCRIPTION OF DRAWINGS

FIG. 3 is a diagram showing relation between a quantization parameter QP and a threshold value a.

FIG. 4 is a diagram showing a configuration of the deblocking filter and a filter setting section.

MODES FOR CARRYING OUT THE INVENTION

A mode for carrying out the present technology will hereinafter be described. An image processing device according to the present technology is applicable to an image coding device for coding image data in a prediction block size, an image decoding device for decoding image data coded in a prediction block size, and the like. Thus, a case where the image processing device according to the present technology is applied to an image coding device and a case where the image processing device according to the present technology is applied to an image decoding device will be described in the following order.

Figure 1:
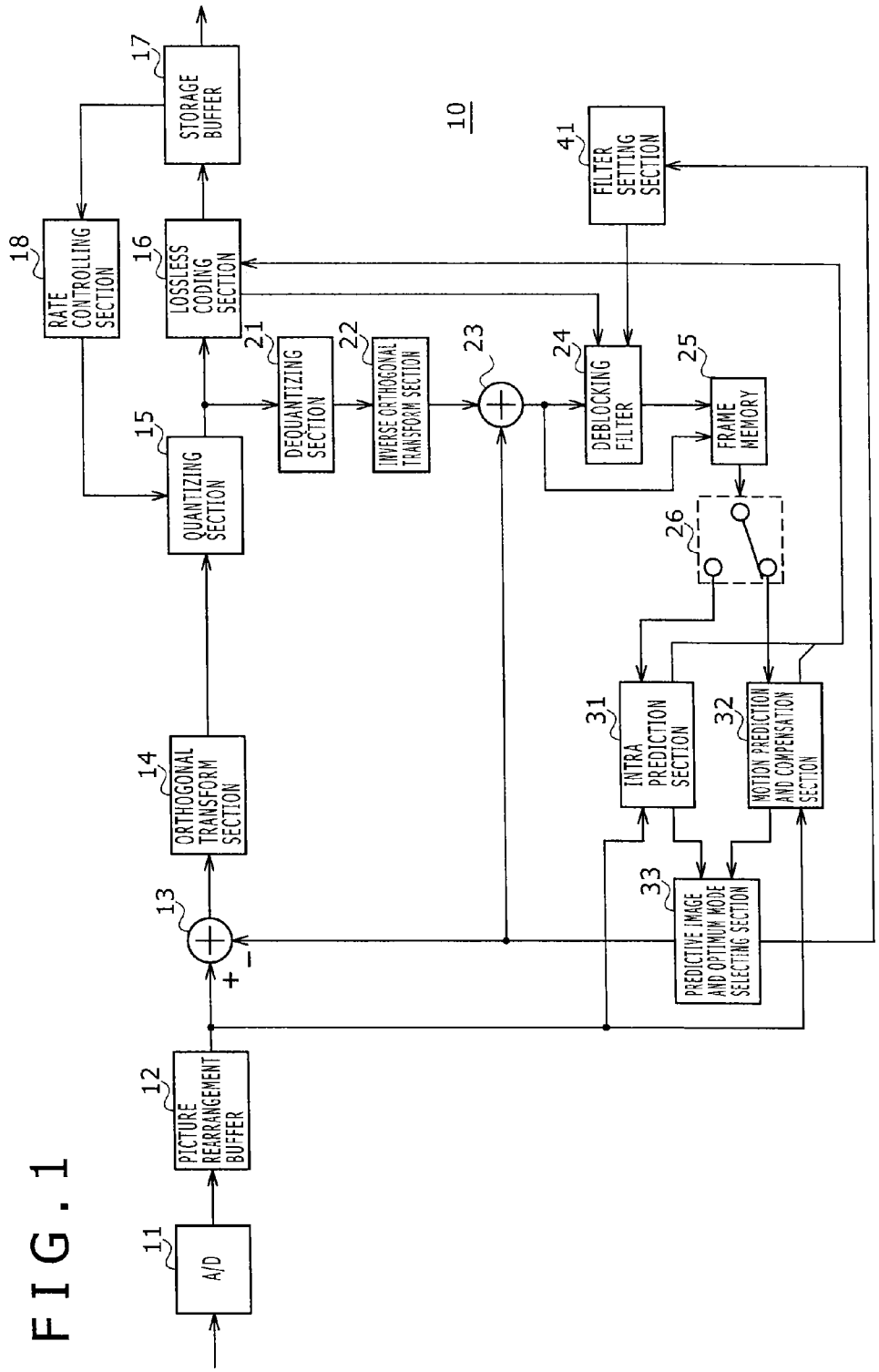
FIG. 1 is a diagram showing a configuration of an image coding device.

1. Configuration of Image Coding Device
2. Filtering of Deblocking Filter
3. Configuration of Deblocking Filter in Image Coding Device
4. Operation of Image Coding Device
5. Configuration of Image Decoding Device
6. Operation of Image Decoding Device
7. Examples of Application 1. Configuration Of Image Coding Device FIG. 1 shows a configuration of an image coding device. The image coding device 10 includes an analog/digital converting section (A/D converting section) 11, a picture rearrangement buffer 12, a subtracting section 13, an orthogonal transform section 14, a quantizing section 15, a lossless coding section 16, a storage buffer 17, and a rate controlling section 18. The image coding device 10 further includes a dequantizing section 21, an inverse orthogonal transform section 22, an adding section 23, a deblocking filter 24, a frame memory 25, a selector 26, an intra prediction section 31, a motion prediction and compensation section 32, and a predictive image and optimum mode selecting section 33.

The A/D converting section 11 converts an analog image signal into digital image data, and outputs the digital image data to the picture rearrangement buffer 12.

The picture rearrangement buffer 12 rearranges frames of the image data output from the A/D converting section 11.

The picture rearrangement buffer 12 rearranges the frames according to a GOP (Group of Pictures) structure involved in a coding process, and outputs the image data after the rearrangement to the subtracting section 13, the intra prediction section 31, and the motion prediction and compensation section 32.

The subtracting section 13 is supplied with the image data output from the picture rearrangement buffer 12 and predictive image data selected by the predictive image and optimum mode selecting section 33 to be described later. The subtracting section 13 calculates prediction error data indicating differences between the image data output from the picture rearrangement buffer 12 and the predictive image data supplied from the predictive image and optimum mode selecting section 33, and outputs the prediction error data to the orthogonal transform section 14.

The orthogonal transform section 14 subjects the prediction error data output from the subtracting section 13 to an orthogonal transform process such as a Discrete Cosine Transform (DCT), a Karhunen-Loeve transform, or the like. The orthogonal transform section 14 outputs transform coefficient data obtained by performing the orthogonal transform process to the quantizing section 15.

The quantizing section 15 is supplied with the transform coefficient data output from the orthogonal transform section 14 and a rate controlling signal from the rate controlling section 18 to be described later. The quantizing section 15 quantizes the transform coefficient data, and outputs the quantized data to the lossless coding section 16 and the dequantizing section 21. In addition, the quantizing section 15 changes a quantization parameter (quantization scale) on the basis of the rate controlling signal from the rate controlling section 18 to change the bit rate of the quantized data.

The lossless coding section 16 is supplied with the quantized data output from the quantizing section 15 and prediction mode information from the intra prediction section 31, the motion prediction and compensation section 32, and the predictive image and optimum mode selecting section 33 to be described later. Incidentally, the prediction mode information includes a macroblock type enabling the identification of a prediction block size, a prediction mode, motion vector information, reference picture information, and the like according to intra prediction or inter prediction. The lossless coding section 16 subjects the quantized data to a lossless coding process by variable-length coding or arithmetic coding, for example, thereby generates a coded stream, and outputs the coded stream to the storage buffer 17. In addition, the lossless coding section 16 losslessly codes the prediction mode information, and adds the prediction mode information to for example header information of the coded stream.

The storage buffer 17 stores the coded stream from the lossless coding section 16. In addition, the storage buffer 17 outputs the stored coded stream at a transmission speed corresponding to a transmission line.

The rate controlling section 18 monitors the free space of the storage buffer 17, generates the rate controlling signal according to the free space, and outputs the rate controlling signal to the quantizing section 15. The rate controlling section 18 for example obtains information indicating the free space from the storage buffer 17. When the free space is reduced, the rate controlling section 18 makes the bit rate of the quantized data decreased by the rate controlling signal. When the storage buffer 17 has a sufficiently large free space, the rate controlling section 18 makes the bit rate of the quantized data raised by the rate controlling signal.

The dequantizing section 21 subjects the quantized data supplied from the quantizing section 15 to a dequantizing process. The dequantizing section 21 outputs transform coefficient data obtained by performing the dequantizing process to the inverse orthogonal transform section 22.

The inverse orthogonal transform section 22 outputs data obtained by subjecting the transform coefficient data supplied from the dequantizing section 21 to an inverse orthogonal transform process to the adding section 23.

The adding section 23 generates decoded image data by adding together the data supplied from the inverse orthogonal transform section 22 and the predictive image data supplied from the predictive image and optimum mode selecting section 33, and outputs the decoded image data to the deblocking filter 24 and the frame memory 25.

The deblocking filter 24 performs filtering to reduce block distortion occurring at a time of image coding. The deblocking filter 24 performs the filtering to remove the block distortion from the decoded image data supplied from the adding section 23, and outputs the decoded image data after the filtering to the frame memory 25. In addition, the deblocking filter 24 sets a tap length and a filtering object pixel range on the basis of parameter values supplied from a filter setting section 41 to be described later.

The frame memory 25 retains the decoded image data supplied from the adding section 23 and the decoded image data after the filtering which decoded image data is supplied from the deblocking filter 24.

The selector 26 supplies the decoded image data before the filtering which decoded image data is read from the frame memory 25 to the intra prediction section 31 to perform intra prediction. In addition, the selector 26 supplies the decoded image data after the filtering which decoded image data is read from the frame memory 25 to the motion prediction and compensation section 32 to perform inter prediction.

The intra prediction section 31 performs an intra prediction process in all intra prediction modes as candidates using the image data of a coding object image output from the picture rearrangement buffer 12 and the decoded image data before the filtering which decoded image data is read from the frame memory 25. Further, the intra prediction section 31 calculates a cost function value for each intra prediction mode, and selects an intra prediction mode in which the calculated cost function value is a minimum, that is, an intra prediction mode in which best coding efficiency is obtained as an optimum intra prediction mode. The intra prediction section 31 outputs predictive image data generated in the optimum intra prediction mode, prediction mode information on the optimum intra prediction mode, and the cost function value in the optimum intra prediction mode to the predictive image and optimum mode selecting section 33. In addition, to obtain amounts of generated code which amounts are used in calculation of the cost function values as will be described later, the intra prediction section 31 outputs, in the intra prediction process in each intra prediction mode, the prediction mode information on the intra prediction mode to the lossless coding section 16.

The motion prediction and compensation section 32 performs a motion prediction and compensation process in all prediction block sizes corresponding to macroblocks. The motion prediction and compensation section 32 detects a motion vector for each image in each prediction block size in the coding object image read from the picture rearrangement buffer 12 using the decoded image data after the filtering which decoded image data is read from the frame memory 25. Further, the motion prediction and compensation section 32 generates a predictive image by applying a motion compensation process to the decoded image on the basis of the detected motion vector. In addition, the motion prediction and compensation section 32 calculates a cost function value for each prediction block size, and selects a prediction block size in which the calculated cost function value is a minimum, that is, a prediction block size in which best coding efficiency is obtained as an optimum inter prediction mode. The motion prediction and compensation section 32 outputs predictive image data generated in the optimum inter prediction mode, prediction mode information on the optimum inter prediction mode, and the cost function value in the optimum inter prediction mode to the predictive image and optimum mode selecting section 33. In addition, to obtain amounts of generated code which amounts are used in calculation of the cost function values, the motion prediction and compensation section 32 outputs, in an inter prediction process in each prediction block size, the prediction mode information on the inter prediction mode to the lossless coding section 16. Incidentally, the motion prediction and compensation section 32 also performs prediction in a skipped macroblock and a direct mode as an inter prediction mode.

The predictive image and optimum mode selecting section 33 compares the cost function value supplied from the intra prediction section 31 with the cost function value supplied from the motion prediction and compensation section 32 in a macroblock unit, and selects the smaller cost function value as an optimum mode in which best coding efficiency is obtained. In addition, the predictive image and optimum mode selecting section 33 outputs the predictive image data generated in the optimum mode to the subtracting section 13 and the adding section 23. Further, the predictive image and optimum mode selecting section 33 outputs the prediction mode information on the optimum mode to the lossless coding section 16 and the filter setting section 41. Incidentally, the predictive image and optimum mode selecting section 33 performs intra prediction or inter prediction in slice units.

The filter setting section 41 generates the parameter value for setting the tap length of the filter and the filtering object pixel range according to the prediction block size indicated by the prediction mode information on the optimum mode, and outputs the parameter value to the deblocking filter 24.

2. Filtering Of Deblocking Filter

The coding system of H264./AVC allows the following three ways of filtering of the deblocking filter to be specified by two parameters of deblocking_filter_control_present_flag of a Picture Parameter Set RBSP included in image compression information and disable_deblocking_filter_idc included in a Slice Header.

(a) Applied to a block boundary and a Macroblock boundary
(b) Applied only to a Macroblock boundary
(c) Not applied As for the quantization parameter QP, QPY is used when the following process is applied to luminance data, and QPC is used when the following process is applied to color-difference data. In addition, in motion vector coding, intra prediction, and entropy coding (CAVLC/CABAC), a pixel value belonging to a different slice is treated as "not available." Further, in filtering, even a pixel value belonging to a different slice is treated as "available" when belonging to a same picture.

In the following description, suppose that as shown in FIG. 2(A), pixel data in blocks P and Q adjacent to each other before filtering at a block boundary is p0 to p4 and q0 to q4 from the position of the boundary. In addition, suppose that as shown in FIG. 2(B), pixel data after the filtering is p0' to p4' and q0' to q4' from the position of the boundary.

Figure 2:
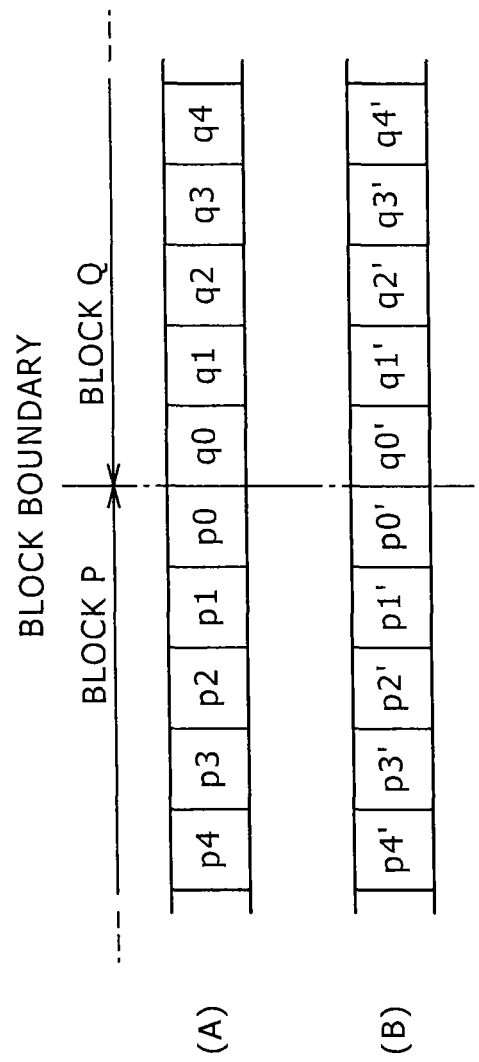
FIG. 2 is a diagram showing pixel data used in filtering of a deblocking filter.

Prior to the filtering, as shown in Table 1, block boundary strength data Bs (Boundary Strength) is defined for a pixel p and a pixel q in FIG. 2.

TABLE 1

| | |
|---|---|
| One of p and q belongs to an intra macroblock, and is located at a Macroblock boundary. | Bs = 4 (Strongest Filtering) |
| One of p and q belongs to an intra macroblock, but is not located at a Macroblock boundary. | Bs = 3 |
| Neither of p and q belongs to an intra macroblock, and one of p and q has a transform coefficient. | Bs = 2 |
| Neither of p and q belongs to an intra macroblock, nor has a transform coefficient. However, reference frames are different, the numbers of reference frames are different, or mv values are different. | Bs = 1 |
| Neither of p and q belongs to an intra macroblock, nor has a transform coefficient. Reference frames and mv values are the same. | Bs = 0 (No Filtering) |

As shown in Table 1, the block boundary strength data Bs is assigned a highest filter strength of "4" when one of the pixel p and the pixel q belongs to an intra coded macroblock MB, and the pixel in question is located at the boundary of the macroblock MB.

The block boundary strength data Bs is assigned "3," which is a high filter strength next to "4," when one of the pixel p and the pixel q belongs to an intra coded macroblock MB, and the pixel in question is not located at the boundary of the macroblock MB.

The block boundary strength data Bs is assigned "2," which is a high filter strength next to "3," when neither of the pixel p and the pixel q belongs to an intra coded macroblock MB, and one of the pixels has a transform coefficient.

The block boundary strength data Bs is assigned "1" when a condition that neither of the pixel p and the pixel q belongs to an intra coded macroblock MB, and one of the pixels has no transform coefficient is satisfied, and a condition that reference frames are different, the numbers of reference frames are different, or motion vectors are different is satisfied.

The block boundary strength data Bs is assigned "0" when neither of the pixel p and the pixel q belongs to an intra coded macroblock MB, nor has a transform coefficient, and reference frames and motion vectors are the same. Incidentally, "0" indicates that the filtering is not performed.

(p2, p1, p0, q0, q1, q2) in FIG. 2 is filtered only when the condition of Equation (1) holds.

$Bs > 0$ $$|p0-q0|<\alpha; |p1-p0|<\beta; |q1-q0|<\beta \qquad (1)$$

Figure 3:
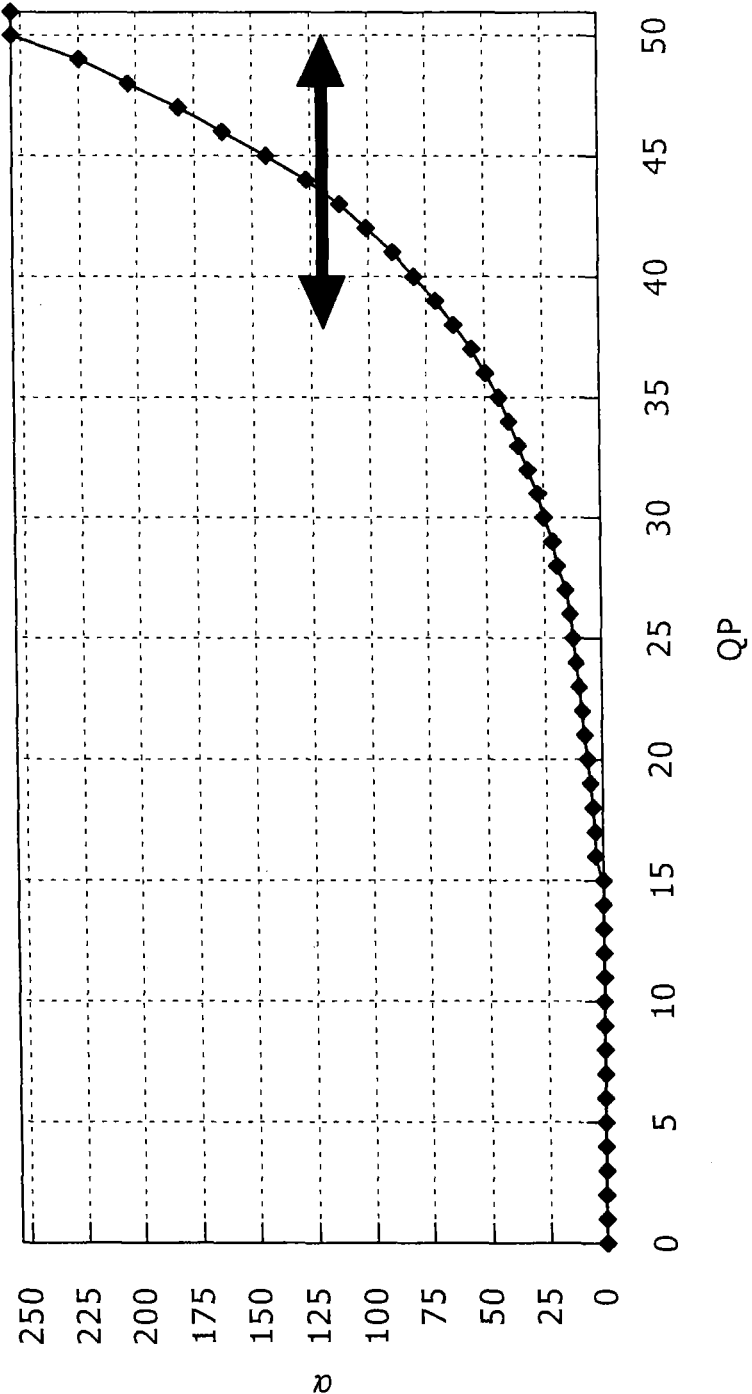

Threshold values $\alpha$ and $\beta$ as a parameter value for adjusting filter strength, that is, a degree of ease of filtering are determined by default according to the quantization parameter QP as follows. In addition, a user can adjust the strength by two parameters of slice_alpha_c0_offset_div2 and slice_beta_offset_div2 included in a Slice Header in image compression information. Incidentally, FIG. 3 shows relation between the quantization parameter QP and the threshold value $\alpha$. When an amount of offset is added to the quantization parameter QP, a curve indicating the relation between the quantization parameter QP and the threshold value a moves in a direction of an arrow. It is thus clear that the filter strength is adjusted.

In addition, indexA and indexB are calculated from Equations (2) to (4) using the respective quantization parameters qPp and qPq of the block P and the block Q adjacent to each other, and the threshold values α and β are obtained from tables shown in Table 2.

$$qPav=(qPp+qPq+1)>>1 \qquad (2)$$

$$indexA=\text{Clip3}(0,51,qPav+\text{FilterOffset}A) \qquad (3)$$

$$indexB=\text{Clip3}(0,51,qPav+\text{FilterOffset}B) \qquad (4)$$

TABLE 2

| | indexA (for α) or indexB (for β) | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

| | indexA (for α) or indexB (for β) | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

Different methods of filtering are defined for a case where "Bs<4" and a case where "Bs=4."

Description will first be made of the case where "Bs<4."

The deblocking filter performs operation shown in Equations (5) to (7) to calculate the pixel data p0' and q0' after the filtering.

Clip3 in Equation (7) denotes a clipping process.

$$p0'=\text{Clip1}(p0+\Delta) \qquad (5)$$

$$q0'=\text{Clip1}(q0+\Delta) \qquad (6)$$

$$\Delta=\text{Clip3}(-tc,tc((((q0-p0)<<2)+(p1-q1)+4)>>3)) \qquad (7)$$

The deblocking filter calculates "tc" in Equation (7) on the basis of Equation (8) when chromaEdgeFlag indicates "0," and otherwise calculates "tc" in Equation (7) on the basis of Equation (9).

In Equation (8), "( )?1:0" indicates "1" when a condition within ( ) is satisfied, and otherwise indicates "0."

$$tc=tc0+((ap</\beta)?1:0)+(aq<\beta)?1:0) \qquad (8)$$

$$tc=tc0+1 \qquad (9)$$

The value of tc is defined as in Table 3 according to the values of Bs and indexA.

In addition, the deblocking filter calculates ap and aq in Equation (8) according to Equations (10) and (11).

$$ap=|p2-p0| \qquad (10)$$

$$aq=|q2-q0| \qquad (11)$$

The deblocking filter calculates the pixel data p1' after the filtering by performing operation shown in Equation (12) when chromaEdgeFlag is "0" and ap is equal to or less than "β," and otherwise obtains the pixel data p1' after the filtering by Equation (13).

$$p1'=p1+\text{Clip3}(-tc0,tc0,(p2+((p0+q0+1)>>1)-(p1<<1))>>1) \qquad (12)$$

$$p1'=p1 \qquad (13)$$

The deblocking filter calculates the pixel data q1' after the filtering by performing operation shown in Equation (14) when chromaEdgeFlag is "0" and aq is equal to or less than "β," and otherwise obtains the pixel data q1' after the filtering by Equation (15).

$$q1'=q1+\text{Clip3}(-tc0,tc0,(q2+((p0+q0+1)>>1)-(q1<<1))>>1) \qquad (14)$$

$$q1'=q1 \qquad (15)$$

In addition, the pixel data p2' and the pixel data q2' are values before the filter.

$$p2'=p2 \qquad (16)$$

$$q2'=q2 \qquad (17)$$

Description will next be made of the case where "Bs=4."

The deblocking filter calculates the pixel data p0', p1', and p2' according to Equations (19) to (21) when chromaEdge-Flag indicates "0" and the condition of Equation (18) is satisfied.

TABLE 3

| | indexA | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| bS = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS = 2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bS = 3 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 |

| | indexA | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| bS = 1 | 1 | 1 | 1 | 1 | 1 | 1 | 1 | 2 | 2 | 2 | 3 | 3 | 3 | 4 | 4 | 4 | 5 | 6 | 6 | 7 | 8 | 9 | 10 | 11 | 13 |
| bS = 2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bS = 3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

$$ap<\beta \&\& |p0-q0|<((\alpha>>2)+2) \tag{18}$$

$$p0'=(p2+2\cdot p1+2\cdot p0+2\cdot q0+q1+4)>>3 \tag{19}$$

$$p1'=(p2+p1+p0+q0+2)>>2 \tag{20}$$

$$p2'=(2\cdot p3+3\cdot p2+p1+p0+q0+4)>>3 \tag{21}$$

The deblocking filter calculates the pixel data p0', p1', and p2' according to Equations (22) to (24) when chromaEdgeFlag indicates "0" and the condition of Equation (18) is not satisfied.

$$p0'=(2\cdot p1+p0+q1+2)>>2 \tag{22}$$

$$p1'=p1 \tag{23}$$

$$p2'=p2 \tag{24}$$

The deblocking filter calculates the pixel data q0', q1', and q2' according to Equations (26) to (28) when chromaEdgeFlag indicates "0" and the condition of Equation (25) is satisfied.

$$aq<\beta \&\& |p0-q0|<((\alpha>>2)+2) \tag{25}$$

$$q0'=(p1+2\cdot p0+2\cdot q0+2\cdot q1+q2+4)>>3 \tag{26}$$

$$q1'=(p0+q0+q1+q2+2)>>2 \tag{27}$$

$$q2'=(2\cdot q3+3\cdot q2+q1+q0+p4+4)>>3 \tag{28}$$

The deblocking filter calculates the pixel data q0', q1', and q2' according to Equations (29) to (31) when chromaEdgeFlag indicates "0" and the condition of Equation (25) is not satisfied.

$$q0'=(2\cdot q1+q0+p1+2)>>2 \tag{29}$$

$$q1'=q1 \tag{30}$$

$$q2'=q2 \tag{31}$$

Thus, in the coding system of H264./AVC, the pixel data p0' to p2' and q0' to q2' is calculated by performing filtering using the pixel data p0 to p3 and q0 to q3.

3. Configuration of Deblocking Filter and Filter Setting Section in Image Coding Device The filter setting section 41 sets a tap length and a filtering object pixel range in the deblocking filter 24 according to the prediction block size of the optimum mode in the macroblock in question.

In general, block distortion is conspicuous to the human eye in a case of a larger block size. In addition, a larger block size tends to be selected for a flat region not including much texture information.

Thus, the filter setting section 41 performs case classification according to the block sizes on adjacent sides of two blocks adjacent to each other, and sets the tap length of filtering and the filtering object pixel range according to a result of the case classification. The filter setting section 41 performs the case classification into for example a case where the adjacent sides of the two blocks adjacent to each other both have a predetermined block size or smaller and a case where at least one of the two blocks adjacent to each other has an extended block size larger than the predetermined block size.

In the case where the block sizes on the adjacent sides of the two blocks adjacent to each other are both a predetermined block size or smaller, for example a macroblock size of the H.264/AVC standard, the filter setting section 41 calculates the pixel data p0' to p2' and q0' to q2' by performing filtering as described above. In the case where at least one of the two blocks adjacent to each other has an extended block size larger than the predetermined block size, the filter setting section 41 extends the tap length or the filtering object pixel range according to the block size of the block boundary. By extending the tap length or the filtering object pixel range, the filter setting section 41 subjects a part of a large block size with a conspicuous block distortion to a smoothing process of higher strength and filtering that is applied to even values of pixels more distant from the block boundary. Thus, the block distortion is made less conspicuous, and the subjective image quality of the decoded image is made more desirable.

Incidentally, the high-frequency component of the image is lost when a smoothing process of higher strength is performed. However, a large block size is often applied to a relatively flat region with a small high-frequency component within the image, so that subjective degradation such as a loss of texture or the like does not occur.

The filter setting section 41 thus generates parameter values indicating the tap length and the filtering object pixel range set according to the prediction block size, and supplies the parameter values to the deblocking filter 24. In addition, when macroblocks of a plurality of different sizes larger than the block size of a predetermined macroblock are used, the filter setting section 41 may set the tap length longer and the filtering object pixel range wider as the block size is increased.

FIG. 4 shows a configuration of the deblocking filter and the filter setting section. The filter setting section 41 includes a block size buffer 411 and a parameter value generating portion 412. In addition, the deblocking filter 24 includes a filter strength determining portion 241 and a filtering portion 242.

The block size buffer 411 accumulates information for one frame image which information indicates the prediction block size in the optimum mode selected by the predictive image and optimum mode selecting section 33. That is, the block size buffer 411 stores information on the prediction block size of each macroblock in one frame image as a coding object.

The parameter value generating portion 412 determines the prediction block sizes on adjacent sides of two blocks adjacent to each other on the basis of the prediction block size information of the block size buffer 411. The parameter value generating portion 412 generates parameter values for setting the tap length of filtering and the filtering object pixel range for a block boundary between the two blocks on the basis of the determined prediction block sizes, and supplies the parameter values to the filter strength determining portion 241.

The filter strength determining portion 241 determines block boundary strength data Bs on the basis of the prediction mode information supplied from the lossless coding section 16, and outputs the determined block boundary strength data Bs and the parameter values supplied from the parameter value generating portion 412 to the filtering portion 242.

The filtering portion 242 performs filtering with the block boundary strength data Bs as well as the tap length and the filtering object pixel range indicated by the parameter values to calculate pixel data after the filtering.

An illustration will be given in the following of case classification into a first case where the prediction block sizes on the adjacent sides of the two blocks adjacent to each other are both a predetermined block size (16×16 pixels) or smaller and a second case where at least one of the two blocks adjacent to each other has an extended block size larger than the predetermined block size. In this case, the filtering of the H.264/AVC coding system described above is performed in the first case. In addition, in the second case, the tap length is set to an extended length to increase the strength of smoothing, and/or the filtering object pixel range is extended to perform filtering up to pixels at positions distant from the block boundary.

An illustration will next be given of filtering when the tap length and the filtering object pixel range are extended.

The filtering portion 242 extends the tap length and the filtering object pixel range on the basis of the parameter values, performs filtering, and calculates pixel data p0' to p3' and q0' to q3' after the filtering from pixel data p0 to p4 and q0 to q4. In this case, the filtering portion 242 uses Equation (32) in place of the above Equation (7).

$$\Delta = \text{Clip3}(-tc, tc(((((q0-p0) << 3) + ((p1-q1) << 1) + (p2-q2) + 8) >> 4)) \quad (32)$$

Further, the filtering portion 242 calculates the pixel data p1' and q1' by using Equations (33) and (34) in place of Equations (12) and (14).

$$p1' = p1 + \text{Clip3}(-tc0, tc0, (p3+p2+p0+((q0+q1+1) >> 1) - (p1 << 2)) >> 2) \quad (33)$$

$$q1' = q1 + \text{Clip3}(-tc0, tc0, (q3+q2+q0+((q0+q1+1) >> 1) - (q1 << 2)) >> 2) \quad (34)$$

In addition, the filtering portion 242 calculates the pixel data p2' and q2' by using Equations (35) and (36) in place of Equations (16) and (17).

$$p2' = p2 + \text{Clip3}(-tc0, tc0, (p4+p3+p1+((p0+q1+1) >> 1) - (p2 << 2)) >> 2) \quad (35)$$

$$q2' = q2 + \text{Clip3}(-tc0, tc0, (q4+q3+q1+((q0+q1+1) >> 1) - (q2 << 2)) >> 2) \quad (36)$$

In addition, when chromaEdgeFlag indicates "0" and the condition of Equation (18) is satisfied, the filtering portion 242 calculates the pixel data p0', p1', p2', and p3' according to Equations (37) to (40).

$$p0' = (p3 + 2 \cdot p2 + 3 \cdot p1 + 4 \cdot p0 + 3 \cdot q0 + 2 \cdot q1 + q2 + 8) >> 4 \quad (37)$$

$$p1' = (p3 + p2 + 2 \cdot p1 + 2 \cdot p0 + q0 + q1 + 4) >> 3 \quad (38)$$

$$p2' = (p4 + 3 \cdot p3 + 4 \cdot p2 + 3 \cdot p1 + 2 \cdot p0 + 2 \cdot q0 + q1 + 8) >> 4 \quad (39)$$

$$p3' = (p4 + 3 \cdot p3 + p2 + p1 + p0 + q0 + 4) >> 3 \quad (40)$$

In addition, when chromaEdgeFlag indicates "0" and the condition of Equation (25) is satisfied, the filtering portion 242 calculates the pixel data q0', q1', q2', and q3' according to Equations (41) to (44).

$$q0' = (p2 + 2 \cdot p1 + 3 \cdot p0 + 4 \cdot q0 + 3 \cdot q1 + 2 \cdot q2 + q3 + 8) >> 4 \quad (41)$$

$$q1' = (p1 + p0 + 2 \cdot q0 + 2 \cdot q1 + q2 + q3 + 4) >> 3 \quad (42)$$

$$q2' = (q4 + 3 \cdot q3 + 4 \cdot q2 + 3 \cdot q1 + 2 \cdot q0 + 2 \cdot p0 + p1 + 8) >> 4 \quad (43)$$

$$q3' = (q4 + 3 \cdot q3 + q2 + q1 + q0 + p0 + 4) >> 3 \quad (44)$$

Incidentally, the setting of the tap length and the filtering object pixel range is not limited to case classification into two cases, that is, a case where two blocks both have a size of 16×16 pixels or a smaller size and a case where at least one of the two blocks is larger than 16×16 pixels. For example, case classification may be performed into a case where two blocks both have a size of 16×16 pixels or a smaller size, a case where at least one of the two blocks is larger than 16×16 pixels and both of the two blocks are 32×32 pixels or smaller, and a case where at least one of the two blocks is larger than 32×32 pixels. In this case, at a boundary of a larger block size, the tap length is further lengthened to increase the strength of smoothing, and the filtering object pixel range is further widened to filter values of pixels distant from the block boundary. In addition, in the setting of the tap length and the filtering object pixel range, only one of the tap length and the filtering object pixel range may be extended according to a result of case classification.

Thus, the image coding device sets the tap length of the filter and the filtering object pixel range according to the block sizes on the adjacent sides of two blocks adjacent to each other, and subjects a part of a large block size with a conspicuous block distortion to smoothing of higher strength and filtering that is applied to even values of pixels more distant from the block boundary. Therefore, the block distortion is made less conspicuous, and the image quality of the decoded image used to generate a predictive image can be made more desirable.

4. Operation Of Image Coding Device

Figure 5:
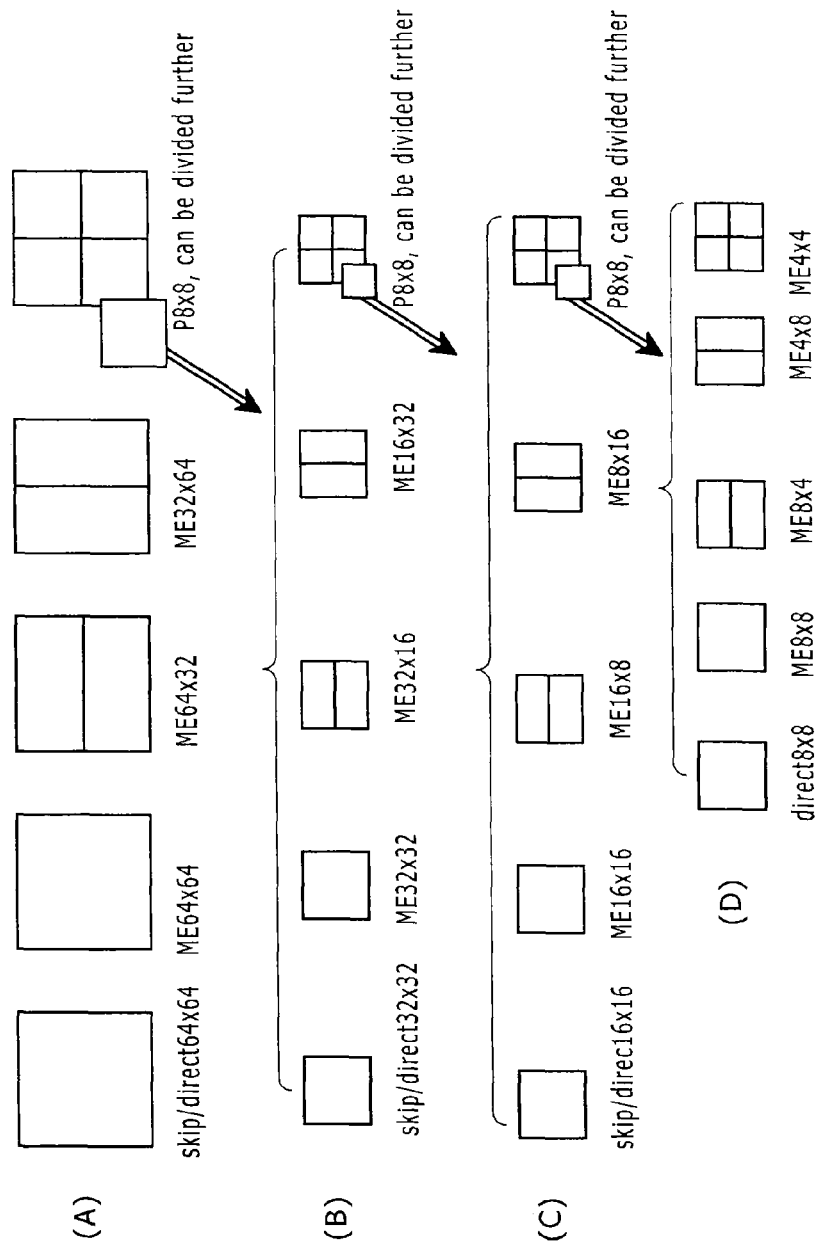
FIG. 5 is a diagram showing prediction block sizes used in image coding processes.

An image coding process operation will next be described. FIG. 5 shows prediction block sizes used in an image coding process. The H.264/AVC system defines prediction block sizes of 16×16 pixels and 4×4 pixels as shown in FIGS. 5(C) and 5(D). In addition, when macroblocks of an extended size larger than that of the H.264/AVC system are used, for example when macroblocks of 32×32 pixels are used, prediction block sizes shown in FIG. 5(B), for example, are defined. When macroblocks of 64×64 pixels are used, prediction block sizes shown in FIG. 5(A), for example, are defined.

Incidentally, "Skip/direct" in FIG. 5 denotes a prediction block size when a skipped macroblock or a direct mode is selected in the motion prediction and compensation section 32. In addition, "ME" denotes a motion compensation block size. In addition, "P8×8" denotes that further division can be made in a lower layer in which the size of the macroblock is reduced.

Figure 6:
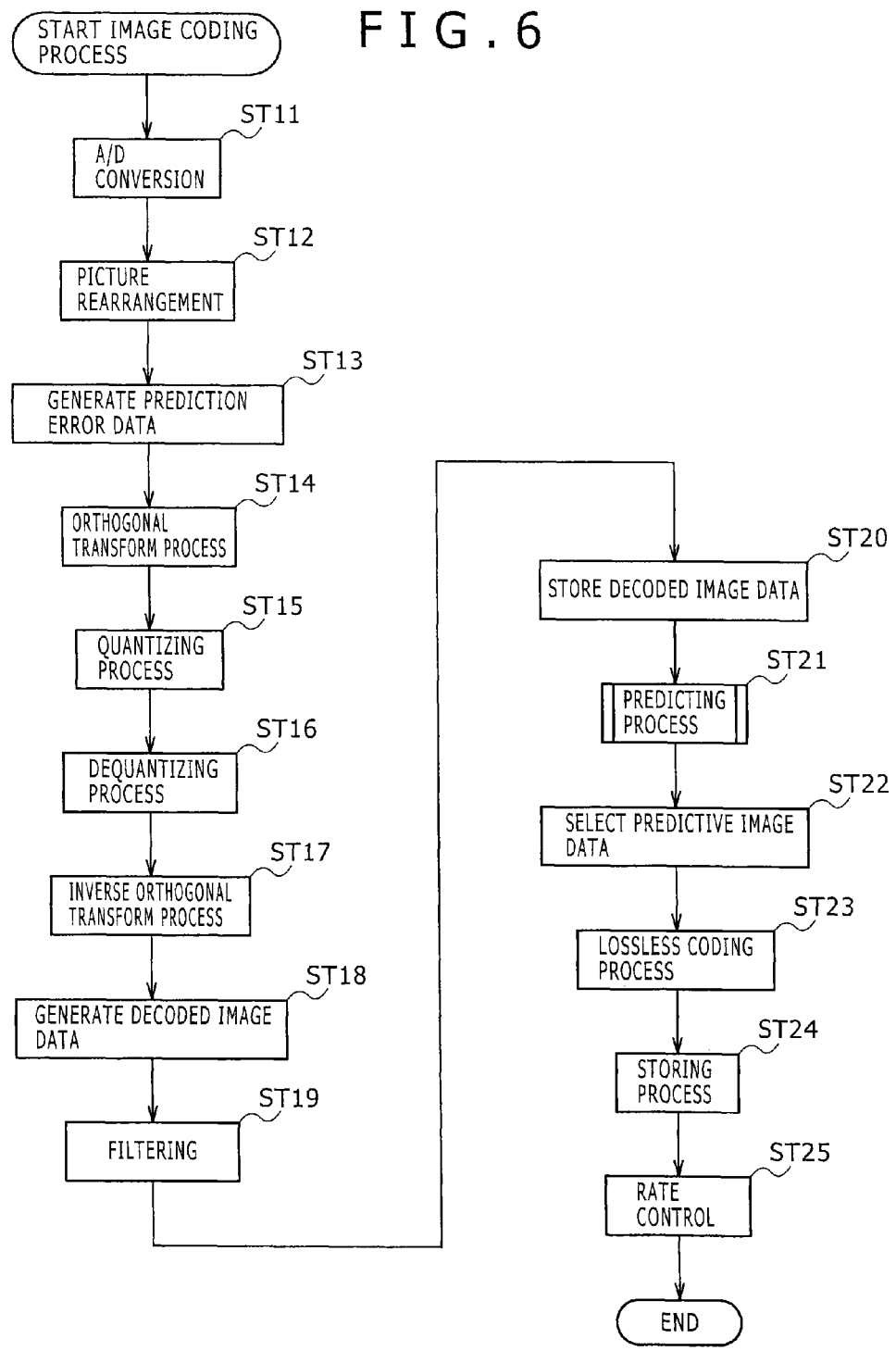
FIG. 6 is a flowchart of an image coding process operation.

FIG. 6 is a flowchart of an image coding process operation. In step ST11, the A/D converting section 11 subjects an input image signal to A/D conversion.

In step ST12, the picture rearrangement buffer 12 performs picture rearrangement. The picture rearrangement buffer 12 stores the image data supplied from the A/D converting section 11, and performs rearrangement from order of display of each picture to order of coding of each picture.

In step ST13, the subtracting section 13 generates prediction error data. The subtracting section 13 generates the prediction error data by calculating differences between the image data of an image rearranged in step ST12 and predictive image data selected by the predictive image and optimum mode selecting section 33. The prediction error data is reduced in amount as compared with the original image data. Therefore, the amount of data can be compressed as compared with a case where the image is coded as it is. Incidentally, when the predictive image and optimum mode selecting section 33 selects a predictive image supplied from the intra prediction section 31 and a predictive image from the motion prediction and compensation section 32 in slice units, intra prediction is performed in a slice for which the predictive image supplied from the intra prediction section 31 is selected. In addition, inter prediction is performed in a slice for which the predictive image from the motion prediction and compensation section 32 is selected.

In step ST14, the orthogonal transform section 14 performs an orthogonal transform process. The orthogonal transform section 14 subjects the prediction error data supplied from the subtracting section 13 to an orthogonal transform. Specifically, the prediction error data is subjected to an orthogonal transform such as a Discrete Cosine Transform, a Karhunen-Loeve transform, or the like, and transform coefficient data is output.

In step ST15, the quantizing section 15 performs a quantizing process. The quantizing section 15 quantizes the transform coefficient data. In the quantization, rate control is performed, as will be described later in description of the process of step ST25.

In step ST16, the dequantizing section 21 performs a dequantizing process. The dequantizing section 21 dequantizes the transform coefficient data quantized by the quantizing section 15 with characteristics corresponding to the characteristics of the quantizing section 15.

In step ST17, the inverse orthogonal transform section 22 performs an inverse orthogonal transform process. The inverse orthogonal transform section 22 subjects the transform coefficient data dequantized by the dequantizing section 21 to an inverse orthogonal transform with characteristics corresponding to the characteristics of the orthogonal transform section 14.

In step ST18, the adding section 23 generates decoded image data. The adding section 23 generates the decoded image data by adding together the predictive image data supplied from the predictive image and optimum mode selecting section 33 and the data after the inverse orthogonal transform at a position corresponding to the predictive image.

In step ST19, the deblocking filter 24 performs filtering. The deblocking filter 24 removes block distortion by filtering the decoded image data output from the adding section 23.

In step ST20, the frame memory 25 stores the decoded image data. The frame memory 25 stores the decoded image data before the filtering and the decoded image data after the filtering.

In step ST21, the intra prediction section 31 and the motion prediction and compensation section 32 each perform a predicting process. Specifically, the intra prediction section 31 performs an intra prediction process in an intra prediction mode, and the motion prediction and compensation section 32 performs a motion prediction and compensation process in an inter prediction mode. Details of the predicting process will be described later in detail with reference to FIG. 7. This process performs respective predicting processes in all prediction modes as candidates, and calculates respective cost function values of all the prediction modes as candidates. Then, an optimum intra prediction mode and an optimum inter prediction mode are selected on the basis of the calculated cost function values, and predictive images generated in the selected prediction modes, the cost functions thereof, and prediction mode information are supplied to the predictive image and optimum mode selecting section 33.

In step ST22, the predictive image and optimum mode selecting section 33 selects predictive image data. The predictive image and optimum mode selecting section 33 determines an optimum mode in which best coding efficiency is obtained on the basis of the respective cost function values output from the intra prediction section 31 and the motion prediction and compensation section 32. Further, the predictive image and optimum mode selecting section 33 selects predictive image data in the determined optimum mode, and supplies the predictive image data to the subtracting section 13 and the adding section 23. This predictive image is used in the operations of steps ST13 and ST18, as described above. Incidentally, the prediction mode information corresponding to the selected predictive image data is output to the lossless coding section 16 and the filter setting section 41.

In step ST23, the lossless coding section 16 performs a lossless coding process. The lossless coding section 16 losslessly codes the quantized data output from the quantizing section 15. Specifically, the quantized data is subjected to lossless coding such as variable-length coding, arithmetic coding, or the like, and the data is compressed. At this time, the prediction mode information (including for example a macroblock type, a prediction mode, motion vector information, reference picture information, and the like) input to the lossless coding section 16 in step ST22 described above and the like are also losslessly coded. Further, the losslessly coded data of the prediction mode information is added to the header information of a coded stream generated by losslessly coding the quantized data.

In step ST24, the storage buffer 17 performs a storing process to store the coded stream. The coded stream stored in the storage buffer 17 is read out as appropriate, and transmitted to a decoding side via a transmission line.

In step ST25, the rate controlling section 18 performs rate control. The rate controlling section 18 controls the rate of quantizing operation of the quantizing section 15 so as to prevent the storage buffer 17 from an overflow or an underflow when the storage buffer 17 stores the coded stream.

Figure 7:
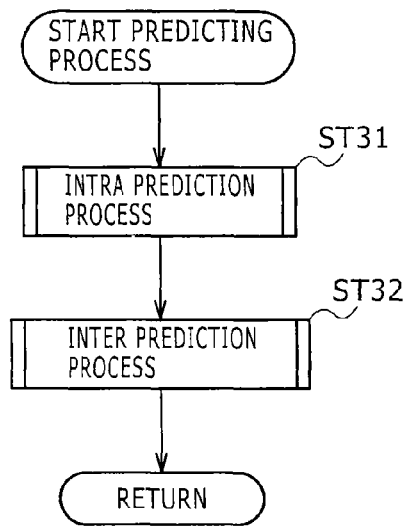
FIG. 7 is a flowchart of a predicting process.

The predicting process in step ST21 in FIG. 6 will next be described with reference to a flowchart of FIG. 7.

In step ST31, the intra prediction section 31 performs an intra prediction process. The intra prediction section 31 performs intra prediction of an image of a block as a processing object in all intra prediction modes as candidates. Incidentally, the decoded image data stored in the frame memory 25 without being filtered by the deblocking filter 24 is used as image data of a decoded image referred to in the intra prediction. Details of the intra prediction process will be described later. This process performs intra prediction in all the intra prediction modes as candidates, and calculates cost function values for all the intra prediction modes as candidates. Then, one intra prediction mode in which best coding efficiency is obtained is selected from all the intra prediction modes on the basis of the calculated cost function values.

In step ST32, the motion prediction and compensation section 32 performs an inter prediction process. The motion prediction and compensation section 32 performs the inter prediction process in all inter prediction modes (all prediction block sizes) as candidates using the decoded image data after the filtering which decoded image data is stored in the frame memory 25. Details of the inter prediction process will be described later. This process performs prediction processes in all the inter prediction modes as candidates, and calculates cost function values for all the inter prediction modes as candidates. Then, one inter prediction mode in which best coding efficiency is obtained is selected from all the inter prediction modes on the basis of the calculated cost function values.

Figure 8:
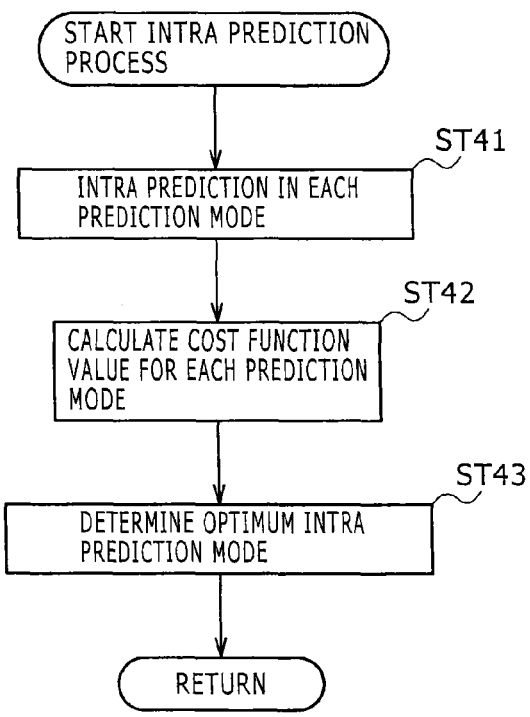
FIG. 8 is a flowchart of an intra prediction process.

The intra prediction process in step ST31 in FIG. 7 will next be described with reference to a flowchart of FIG. 8.

In step ST41, the intra prediction section 31 performs intra prediction in each prediction mode. The intra prediction section 31 generates predictive image data for each intra prediction mode using the decoded image data before the filtering which decoded image data is stored in the frame memory 25.

In step ST42, the intra prediction section 31 calculates a cost function value for each prediction mode. The cost function value is calculated on the basis of the method of one of a High Complexity mode and a Low Complexity mode as defined in a JM (Joint Model) as reference software in the H.264/AVC system.

Specifically, in the High Complexity mode, as the process of step ST41, up to the lossless coding process is tentatively performed for all the prediction modes as candidates, and a cost function value expressed by the following Equation (45) is calculated for each prediction mode.

$$\text{Cost}(\text{Mode} \in \Omega) = D + \lambda \cdot R \quad (45)$$

$\Omega$ denotes a universal set of the prediction modes as candidates for coding a block or a macroblock in question. D denotes difference energy (distortion) between a decoded image and an input image when coding is performed in a prediction mode. R is an amount of code generated including orthogonal transform coefficients, prediction mode information, and the like. $\lambda$ is a Lagrange multiplier given as a function of the quantization parameter QP.

That is, coding in the High Complexity Mode requires a tentative encoding process to be performed once in all the prediction modes as candidates to calculate the above parameters D and R, and needs a larger amount of operation.

On the other hand, in the Low Complexity mode, as the process of step ST41, a predictive image is generated and up to header bits of motion vector information, prediction mode information, and the like are calculated for all the prediction modes as candidates, and a cost function value expressed by the following Equation (46) is calculated for each prediction mode.

$$\text{Cost}(\text{Mode} \in \Omega) = D + \text{QPtoQuant}(QP) \cdot \text{Header\_Bit} \quad (46)$$

$\Omega$ denotes a universal set of the prediction modes as candidates for coding a block or a macroblock in question. D denotes difference energy (distortion) between a decoded image and an input image when coding is performed in a prediction mode. Header_Bit is header bits for the prediction mode. QPtoQuant is a function given as a function of the quantization parameter QP.

That is, the Low Complexity Mode requires the prediction process to be performed for each prediction mode, but does not require a decoded image, so that the prediction process can be realized with a smaller amount of operation than in the High Complexity Mode.

In step ST43, the intra prediction section 31 determines an optimum intra prediction mode. On the basis of the cost function values calculated in step ST42, the intra prediction section 31 selects one intra prediction mode whose cost function value is a minimum value among the cost function values, and determines the intra prediction mode as the optimum intra prediction mode.

Figure 9:
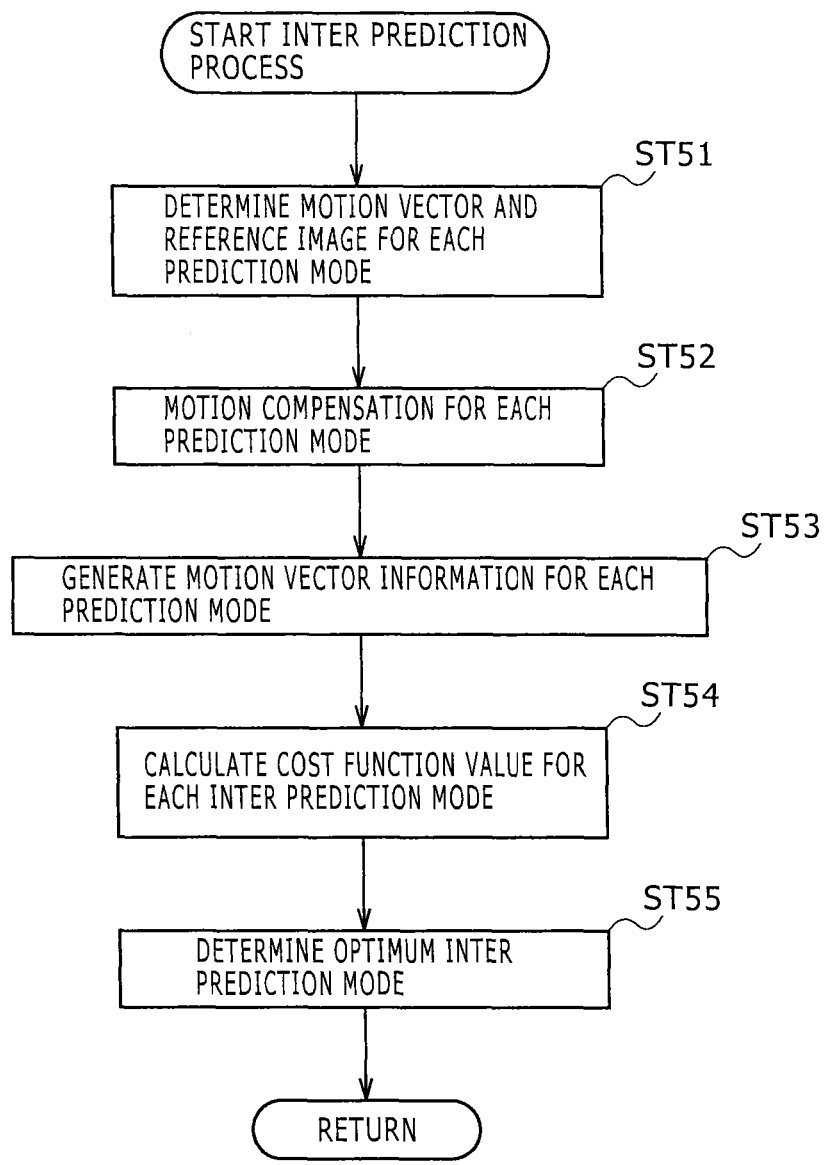
FIG. 9 is a flowchart of an inter prediction process.

The inter prediction process in step ST32 in FIG. 7 will next be described with reference to a flowchart of FIG. 9.

In step ST51, the motion prediction and compensation section 32 determines a motion vector and a reference image for each prediction mode. That is, the motion prediction and compensation section 32 determines a motion vector and a reference image for a block as a processing object in each prediction mode.

In step ST52, the motion prediction and compensation section 32 performs motion compensation for each prediction mode. The motion prediction and compensation section 32 applies motion compensation to the reference image in each prediction mode (each prediction block size) on the basis of the motion vector determined in step ST51, and generates predictive image data for each prediction mode.

In step ST53, the motion prediction and compensation section 32 generates motion vector information for each prediction mode. The motion prediction and compensation section 32 generates motion vector information to be included in the coded stream which information is about the motion vector determined in each prediction mode. For example, a predicted motion vector is determined using median prediction or the like, and motion vector information indicating a difference between the motion vector detected by motion prediction and the predicted motion vector is generated. The thus generated motion vector information is also used to calculate a cost function value in next step ST54, and is included in prediction mode information and output to the lossless coding section 16 when the predictive image and optimum mode selecting section 33 finally selects the corresponding predictive image.

In step ST54, the motion prediction and compensation section 32 calculates a cost function value for each inter prediction mode. The motion prediction and compensation section 32 calculates the cost function value using Equation (45) or Equation (46) described above. Incidentally, the calculation of cost function values for inter prediction modes includes evaluation of cost function values in the Skip Mode and the Direct Mode defined in the H.264/AVC system.

In step ST55, the motion prediction and compensation section 32 determines an optimum inter prediction mode. On the basis of the cost function values calculated in step ST54, the motion prediction and compensation section 32 selects one prediction mode whose cost function value is a minimum value among the cost function values, and determines the prediction mode as the optimum inter prediction mode.

Figure 10:
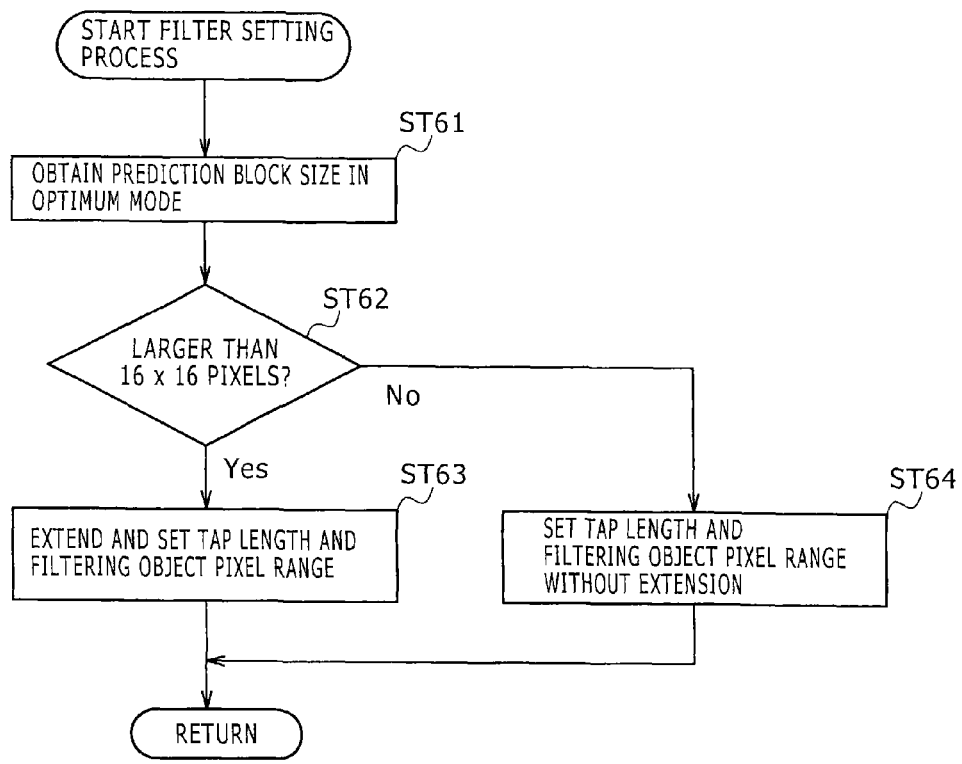
FIG. 10 is a flowchart of a filter setting process.

A filter setting process will next be described with reference to a flowchart of FIG. 10. Incidentally, FIG. 10 represents a case where the tap length and the filtering object pixel range are extended.

In step ST61, the filter setting section 41 obtains the prediction block size in the optimum mode. The filter setting section 41 obtains the prediction block size corresponding to the predictive image selected in step ST22 in FIG. 6, that is, the prediction block size when coding is performed in the optimum mode.

In step ST62, the filter setting section 41 determines whether a block in question or an adjacent block is larger than 16×16 pixels. When at least one of the block in question and the adjacent block is larger than 16×16 pixels, the filter setting section 41 proceeds to step ST63. When the block in question and the adjacent block are both 16×16 pixels or smaller, the filter setting section 41 proceeds to step ST64.

In step ST63, the filter setting section 41 extends and sets the tap length and the filtering object pixel range. For example, the filter setting section 41 extends the tap length and the filtering object pixel range more than in the H.264/AVC coding system, and makes pixel data p0' to p3' and q0' to q3' after filtering calculated as described above.

In step ST64, the filter setting section 41 sets the tap length and the filtering object pixel range without extension. For example, the filter setting section 41 sets the tap length and the filtering object pixel range of the H.264/AVC system, and makes pixel data p0' to p2' and q0' to q2' after filtering calculated as described above.

Thus, according to the image coding device and the image coding method to which the present technology is applied, a prediction block size providing best coding efficiency is determined, and image data is coded in the determined prediction block size. At this time, information indicating the prediction block size is stored in the block size buffer 411 in the filter setting section 41. Therefore, the position of the prediction block in a decoded image is clear when decoded image data is generated by decoding the image data coded in the prediction block size providing the best coding efficiency. Thus, the tap length and the filtering object pixel range are set according to the prediction block size on the basis of the information stored in the block size buffer 411, whereby block distortion can be reduced even when the prediction block size is large. In addition, because the block distortion in the decoded image data for generating a predictive image can be reduced, an increase in amount of prediction error data due to effect of the block distortion can be prevented. Thus, an amount of data after the coding process can be further reduced.

5. Configuration Of Image Decoding Device

The coded stream generated by coding an input image is supplied to an image decoding device via a predetermined transmission line, a recording medium, or the like, and decoded.

Figure 11:
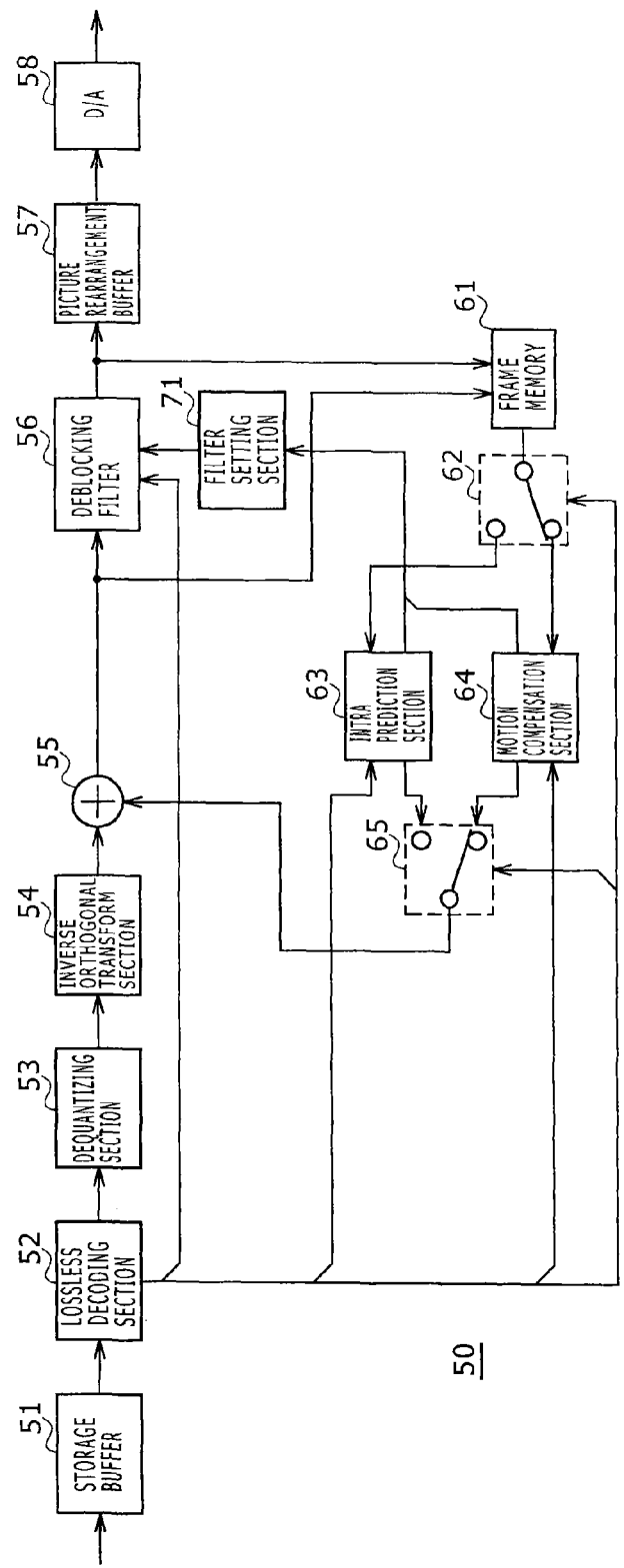
FIG. 11 shows a configuration of an image decoding device.

FIG. 11 shows a configuration of an image decoding device. The image decoding device 50 includes a storage buffer 51, a lossless decoding section 52, a dequantizing section 53, an inverse orthogonal transform section 54, an adding section 55, a deblocking filter 56, a picture rearrangement buffer 57, and a D/A converting section 58. The image decoding device 50 further includes a frame memory 61, selectors 62 and 65, an intra prediction section 63, a motion compensation section 64, and a filter setting section 71.

The storage buffer 51 stores the transmitted coded stream. The lossless decoding section 52 decodes the coded stream supplied from the storage buffer 51 by a system corresponding to the coding system of the lossless coding section 16 in FIG. 1. In addition, the lossless decoding section 52 outputs prediction mode information obtained by decoding the header information of the coded stream to the intra prediction section 63, the motion compensation section 64, and the deblocking filter 56.

The dequantizing section 53 dequantizes the quantized data decoded by the lossless decoding section 52 by a system corresponding to the quantizing system of the quantizing section 15 in FIG. 1. The inverse orthogonal transform section 54 subjects the output of the dequantizing section 53 to an inverse orthogonal transform by a system corresponding to the orthogonal transform system of the orthogonal transform section 14 in FIG. 1, and outputs the data after the inverse orthogonal transform to the adding section 55.

The adding section 55 generates decoded image data by adding together the data after the inverse orthogonal transform and predictive image data supplied from the selector 65, and outputs the decoded image data to the deblocking filter 56 and the frame memory 61.

The deblocking filter 56 is configured in a similar manner to the deblocking filter 24 in FIG. 1. The deblocking filter 56 removes block distortion by filtering the decoded image data supplied from the adding section 55. Then, the deblocking filter 56 supplies the decoded image data to the frame memory 61 to make the decoded image data stored in the frame memory 61, and outputs the decoded image data to the picture rearrangement buffer 57. In addition, the deblocking filter 56 sets a tap length and a filtering object pixel range to perform the filtering, on the basis of the prediction mode information supplied from the lossless decoding section 52 and parameter values supplied from the filter setting section 71 to be described later.

The picture rearrangement buffer 57 performs picture rearrangement. Specifically, frames rearranged for coding by the picture rearrangement buffer 12 of FIG. 1 are rearranged into the original display order, and the rearranged image data is output to the D/A converting section 58.

The D/A converting section 58 subjects the image data supplied from the picture rearrangement buffer 57 to D/A conversion, and makes the image displayed by outputting the image data to a display not shown in the figure.

The frame memory 61 retains the decoded image data before the filtering which decoded image data is supplied from the adding section 55 and the decoded image data after the filtering which decoded image data is supplied from the deblocking filter 24.

The selector 62 supplies the decoded image data before the filtering which decoded image data is read out from the frame memory 61 to the intra prediction section 63 when a prediction block in which intra prediction has been performed is decoded on the basis of the prediction mode information supplied from the lossless decoding section 52. In addition, the selector 26 supplies the decoded image data after the filtering which decoded image data is read out from the frame memory 61 to the motion compensation section 64 when a prediction block in which inter prediction has been performed is decoded on the basis of the prediction mode information supplied from the lossless decoding section 52.

The intra prediction section 63 generates a predictive image on the basis of the prediction mode information supplied from the lossless decoding section 52, and outputs the generated predictive image data to the selector 65. In addition, the intra prediction section 63 outputs information indicating the block size of the generated predictive image to the filter setting section 71.

The motion compensation section 64 performs motion compensation on the basis of the prediction mode information supplied from the lossless decoding section 52, generates predictive image data, and outputs the predictive image data to the selector 65. That is, on the basis of motion vector information and reference frame information included in the prediction mode information, the motion compensation section 64 applies motion compensation to a reference image indicated by the reference frame information with a motion vector based on the motion vector information, and generates the predictive image data. In addition, the motion compensation section 64 outputs information indicating the block size of the generated predictive image to the filter setting section 71.

The selector 65 supplies the predictive image data generated in the intra prediction section 63 to the adding section 55. In addition, the selector 65 supplies the predictive image data generated in the motion compensation section 64 to the adding section 55.

The filter setting section 71 is configured in a similar manner to the filter setting section 41 shown in FIG. 4. In addition, the filter setting section 71 stores information indicating the prediction block sizes of decoded blocks. The filter setting section 71 sets the tap length and the filtering object pixel range according to the prediction block sizes on adjacent sides of a block as a decoding object and a decoded block adjacent to the block as the decoding object. The filter setting section 71 supplies parameter values indicating the set tap length and the set filtering object pixel range to the deblocking filter 56. In addition, when the prediction block size in the optimum mode of one of the block in question and the adjacent block is an extended block size, the filter setting section 71 sets the tap length and the filtering object pixel range according to the larger prediction block size. In addition, when a plurality of macroblocks having a larger size than a predetermined macroblock are used, the filter setting section 71 sets the tap length longer and the filtering object pixel range wider as the size is increased.

6. Operation Of Image Decoding Device

An image decoding process operation performed in the image decoding device 50 will next be described with reference to a flowchart of FIG. 12.

In step ST71, the storage buffer 51 stores a transmitted coded stream. In step ST72, the lossless decoding section 52 performs a lossless decoding process. The lossless decoding section 52 decodes the coded stream supplied from the storage buffer 51. That is, the quantized data of each picture coded by the lossless coding section 16 in FIG. 1 is obtained. In addition, the lossless decoding section 52 losslessly decodes prediction mode information included in the header information of the coded stream, and supplies the obtained prediction mode information to the deblocking filter 56 and the selectors 62 and 65. Further, when the prediction mode information is information on an intra prediction mode, the lossless decoding section 52 outputs the prediction mode information to the intra prediction section 63. In addition, when the prediction mode information is information on an inter prediction mode, the lossless decoding section 52 outputs the prediction mode information to the motion compensation section 64.

In step ST73, the dequantizing section 53 performs a dequantizing process. The dequantizing section 53 dequantizes the quantized data decoded by the lossless decoding section 52 with characteristics corresponding to the characteristics of the quantizing section 15 in FIG. 1.

In step ST74, the inverse orthogonal transform section 54 performs an inverse orthogonal transform process. The inverse orthogonal transform section 54 subjects the transform coefficient data dequantized by the dequantizing section 53 to an inverse orthogonal transform with characteristics corresponding to the characteristics of the orthogonal transform section 14 in FIG. 1.

In step ST75, the adding section 55 generates decoded image data. The adding section 55 generates the decoded image data by adding together the data obtained by performing the inverse orthogonal transform process and predictive image data selected in step ST79 to be described later. The original image is thereby decoded.

In step ST76, the deblocking filter 56 performs filtering. The deblocking filter 56 filters the decoded image data output from the adding section 55 to remove block distortion included in the decoded image.

In step ST77, the frame memory 61 stores the decoded image data.

In step ST78, the intra prediction section 63 and the motion compensation section 64 generate predictive image data. The intra prediction section 63 and the motion compensation section 64 each generate predictive image data so as to correspond to the prediction mode information supplied from the lossless decoding section 52.

Specifically, when the prediction mode information for intra prediction is supplied from the lossless decoding section 52, the intra prediction section 63 performs an intra prediction process using the decoded image data in the frame memory 61 on the basis of the prediction mode information, and generates the predictive image data. In addition, when the prediction mode information for inter prediction is supplied from the lossless decoding section 52, the motion compensation section 64 performs motion compensation using the decoded image data in the frame memory 61 on the basis of the prediction mode information, and generates the predictive image data.

In step ST79, the selector 65 selects predictive image data. Specifically, the selector 65 selects the predictive image supplied from the intra prediction section 63 and the predictive image data generated in the motion compensation section 64, and supplies the predictive image data to the adding section 55 to make the predictive image data added to the output of the inverse orthogonal transform section 54 in step ST75 as described above.

In step ST80, the picture rearrangement buffer 57 performs picture rearrangement. Specifically, the picture rearrangement buffer 57 rearranges frames rearranged for coding by the picture rearrangement buffer 12 in the image coding device 10 of FIG. 1 into the original display order.

In step ST81, the D/A converting section 58 subjects the image data from the picture rearrangement buffer 57 to D/A conversion. This image is output to a display not shown in the figures, and the image is displayed.

Figure 12:
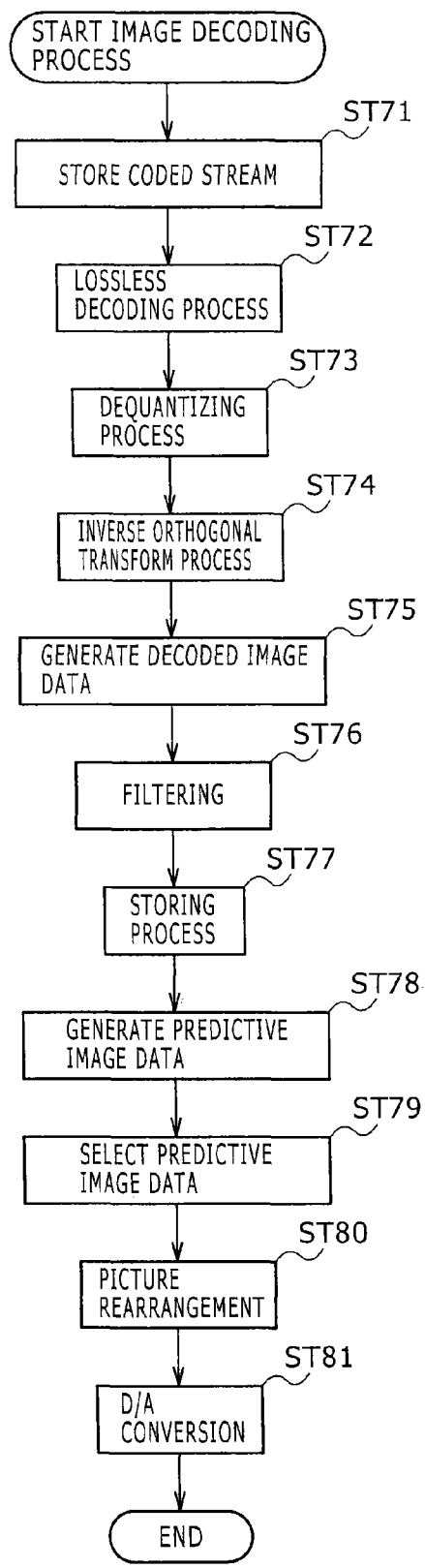
FIG. 12 is a flowchart of an image decoding process operation.

In addition, in the filtering in step ST76 in FIG. 12, the filter setting section 71 performs the filter setting process shown in FIG. 10 described above. The filter setting section 71 sets the tap length and the filtering object pixel range according to the prediction block sizes on adjacent sides of a block as a decoding object and a decoded block adjacent to the block as the decoding object. When the block size on the adjacent side of at least one of the block in question and the adjacent block is extended, the filter setting section 71 sets an extended tap length and an extended filtering object pixel range. Incidentally, the prediction block size on the adjacent side of the decoded block is stored in a block size buffer in the filter setting section 71 when the adjacent block is decoded. The filter setting section 71 generates parameter values indicating the set tap length and the set filtering object pixel range, and outputs the parameter values to the deblocking filter 56. The deblocking filter 56 applies the filtering to a block boundary between the block as the decoding object and the decoded block adjacent to the block as the decoding object with the tap length and the filtering object pixel range indicated by the parameter values supplied from the filter setting section 71.

Thus, according to the image decoding device and the image decoding method to which the present technology is applied, information indicating prediction block size used in a coding process is stored in the block size buffer in the filter setting section 71. Therefore, the position of a prediction block in a decoded image is clear when the decoded image data for image display is generated by decoding the coded stream. Thus, on the basis of the information stored in the block size buffer, a part of a large block size with a conspicuous block distortion is subjected to filtering that is applied to even values of pixels more distant from the block boundary and a smoothing process of higher strength. Hence, a decoded image of excellent image quality with an inconspicuous block distortion can be obtained.

Further, it suffices for the filter setting section of an image processing device to set the tap length and the filtering object pixel range according to whether the decoded image data is image data for generating a predictive image or image data for image display. When the image processing device is an image coding device, for example, the filter setting section makes settings for the decoded image data for generating a predictive image so that the image quality of the decoded image used to generate the predictive image is an excellent image quality and the amount of data of the coded stream is reduced. In addition, when the image processing device is an image decoding device, the filter setting section makes settings so that the image quality of the decoded image used for image display is an image quality desired by a user. Thus, it is possible to perform deblocking filtering suitable for image coding when the filter setting section is provided in the image coding device and deblocking filtering suitable for the image decoding device which deblocking filtering is performed by the filter setting section.

The series of processes described in the specification can be performed by hardware, software, or a composite configuration of both hardware and software. When processing is performed by software, a program in which a processing sequence is recorded is installed into a memory within a computer incorporated in dedicated hardware, and executed. Alternatively, the program can be installed on a general-purpose computer capable of performing various kinds of processing, and executed.

For example, the program can be recorded in advance on a hard disk as a recording medium or in a ROM (Read Only Memory) as a recording medium. Alternatively, the program can be stored (recorded) temporarily or permanently on a removable recording medium such as a flexible disk, a CD-ROM (Compact Disc Read Only Memory), an MO (Magneto optical) disk, a DVD (Digital Versatile Disc), a magnetic disk, a semiconductor memory, or the like. Such a removable recording medium can be provided as so-called packaged software.

Incidentally, in addition to being installed from a removable recording medium as described above onto a computer, the program is transferred by radio from a download site to a computer or transferred by wire to a computer via networks such as a LAN (Local Area Network), the Internet, and the like. The computer can receive the program transferred in such a manner, and install the program onto a recording medium such as a built-in hard disk or the like.

In addition, in the foregoing embodiment, description has been made of a case where the tap length and the filtering object pixel range as parameter values are set according to the block sizes of adjacent blocks adjacent to each other at a block boundary. However, when at least one of the adjacent blocks has an extended block size larger than a predetermined block size, the filter setting section may set the value of block boundary strength data used for filtering to an extended value to be able to obtain an image of excellent image quality with a reduced block distortion. For example, the filter setting section sets the value of block boundary strength data used for filtering larger as the block size of the adjacent block is increased, to reduce block distortion.

The size of processing units of the deblocking filter or the size of macroblocks is not limited to the examples described in the present specification, but may be other sizes. For example, whereas the size of macroblocks of H.264/AVC is fixed at 16×16 pixels, the size of coding units of HEVC can be dynamically specified for each sequence. A coding unit of HEVC is referred to also as a coding tree block. A coding unit having a maximum size is referred to as a largest coding unit (LUC). A coding unit having a minimum size is referred to as a smallest coding unit (SCU). A range of sizes of usable coding units is defined by specifying the sizes of the LCU and the SCU in a sequence parameter set as a part of image compression information. Further, the sizes of coding units used in individual sequences are identified by specifying the value of split_flag.

When a coding unit has a square shape, the size of one side is expressed by a power of two. Coding units can be further divided into prediction units (PU) as processing units of intra prediction and inter prediction. In addition, coding units can be divided into transform units (TU) as processing units of an orthogonal transform. HEVC allows the use of transform units having sizes of 16×16 pixels and 32×32 pixels in addition to 4×4 pixels and 8×8 pixels. The term "block" in the present specification includes the concept of macroblocks, coding units, prediction units, transform units, or various other units.

The sizes of blocks may be fixed or may change dynamically. Block sizes are not limited to the examples described in the present specification, but may be other sizes. A similar method can be used for blocks of 16×16 pixels or smaller, such as block sizes of 4, 8, and 16, for example. Also in this case, it suffices to set the tap length of the filter longer or set the filtering object pixel range wider as the block size is increased.

The present technology is applicable to not only cases of squares having block sizes of 4×4 pixels, 8×8 pixels, 16×16 pixels, and 32×32 pixels but also cases of non-squares, which are 8×2 pixels, 2×8 pixels, 16×4 pixels, 4×16 pixels, 32×8 pixels, and 8×32 pixels. In this case, the tap length of filtering or the filtering object pixel range can be set according to the block sizes on adjacent sides of adjacent blocks. In addition, the tap length of filtering or the filtering object pixel range can be set according to the block sizes on unadjacent sides of the adjacent blocks. Further, whether to apply the block sizes on the adjacent sides or whether to apply the block sizes on the unadjacent sides can be adaptively selected according to the shapes and block sizes of the blocks.

In addition, a method of transmitting the information used for the processing of the deblocking filter from the coding side to the decoding side is not limited to a method of multiplexing these pieces of information in the header of the coded stream. For example, these pieces of information may be transmitted or recorded as separate data associated with the coded bit stream without being multiplexed in the coded bit stream. The term "associated" in this case means that an image included in the bit stream (which image may be a part of an image such as a slice, a block, or the like) and information corresponding to the image in question can be linked to each other at a time of decoding. That is, the information may be transmitted on a different transmission line from that of the image (or the bit stream). In addition, the information may be recorded on a different recording medium (or in a different recording area in a same recording medium) from that of the image (or the bit stream). Further, the information and the image (or the bit stream) may be associated with each other in arbitrary units such as a plurality of frames, one frame, or a part within a frame, for example.

7. EXAMPLES OF APPLICATION

The image coding device 10 and the image decoding device 50 according to the foregoing embodiment can be applied to various electronic devices including transmitters or receivers in satellite broadcasting, wire broadcasting such as cable TV, distribution on the Internet, distribution to terminals by cellular communication, and the like, recording devices for recording images onto media such as optical disks, magnetic disks, and flash memories, or reproducing devices for reproducing the images from these storage media. Four examples of application will be described in the following.

7-1. First Example of Application

Figure 13:
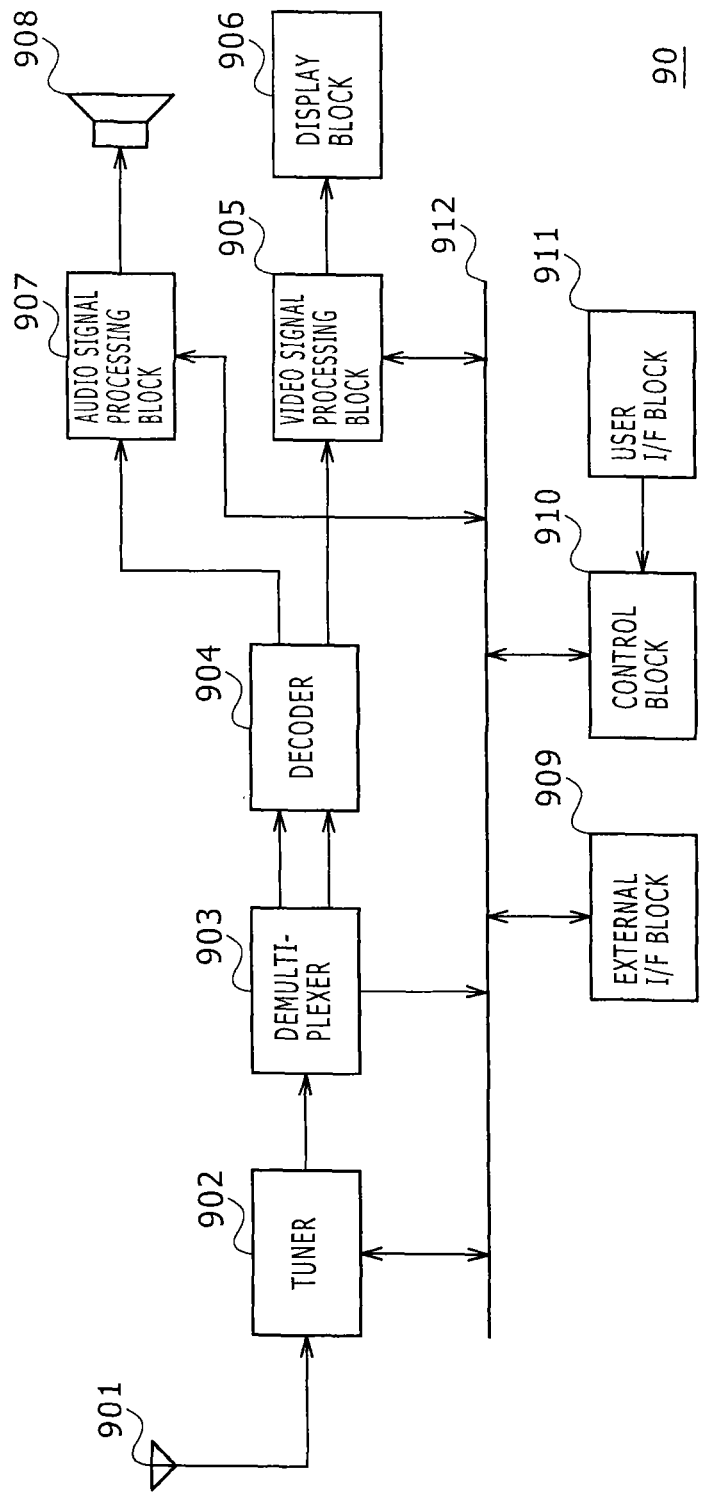
FIG. 13 is a diagram illustrating a schematic configuration of a television device.

FIG. 13 shows an example of a schematic configuration of a television device to which the foregoing embodiment is applied. A television device 90 includes an antenna 901, a tuner 902, a demultiplexer 903, a decoder 904, a video signal processing block 905, a display block 906, an audio signal processing block 907, a speaker 908, an external interface 909, a control block 910, a user interface 911, and a bus 912.

The tuner 902 extracts a signal of a desired channel from a broadcast signal received via the antenna 901, and demodulates the extracted signal. The tuner 902 then outputs a coded bit stream obtained by the demodulation to the demultiplexer 903. That is, the tuner 902 has a function as transmitting means in the television device 90 for receiving a coded stream having a coded image.

The demultiplexer 903 separates a video stream and an audio stream of a program as a viewing object from the coded bit stream, and outputs each of the separated streams to the decoder 904. In addition, the demultiplexer 903 extracts auxiliary data of an EPG (Electronic Program Guide) or the like from the coded bit stream, and supplies the extracted data to the control block 910. Incidentally, when the coded bit stream is scrambled, the demultiplexer 903 may perform descrambling.

The decoder 904 decodes the video stream and the audio stream input from the demultiplexer 903. The decoder 904 then outputs video data generated by the decoding process to the video signal processing block 905. In addition, the decoder 904 outputs audio data generated by the decoding process to the audio signal processing block 907.

The video signal processing block 905 reproduces the video data input from the decoder 904, and makes video displayed on the display block 906. The video signal processing block 905 may also make an application screen supplied via a network displayed on the display block 906. The video signal processing block 905 may also subject the video data to an additional process such as noise removal, for example, according to settings. The video signal processing block 905 may further generate for example a GUI (Graphical User Interface) image of a menu, a button, a cursor, or the like, and superimpose the generated image on the output image.

The display block 906 is driven by a driving signal supplied from the video signal processing block 905. The display block 906 displays a video or an image on a video screen of a display device (for example a liquid crystal display, a plasma display, or an OLED).

The audio signal processing block 907 subjects the audio data input from the decoder 904 to a reproducing process such as D/A conversion, amplification, and the like, and makes audio output from the speaker 908. The audio signal processing block 907 may also subject the audio data to an additional process such as noise removal. The external interface 909 is an interface for connecting the television device 90 and an external device or a network. For example, a video stream or an audio stream received via the external interface 909 may be decoded by the decoder 904. That is, the external interface 909 also has a function as transmitting means in the television device 90 for receiving a coded stream having a coded image.

The control block 910 has a processor such as a CPU (Central Processing Unit), and a memory such as a RAM (Random Access Memory) and a ROM (Read Only Memory). The memory stores a program executed by the CPU, program data, EPG data, data obtained via a network, and the like. The program stored by the memory is, for example, read and executed by the CPU at a time of starting the television device 90. By executing the program, the CPU controls an operation of the television device 90 according to an operating signal input from the user interface 911, for example.

The user interface 911 is connected to the control block 910. The user interface 911 has, for example, a button and a switch for a user to operate the television device 90, a portion for receiving a remote control signal, and the like. The user interface 911 detects an operation by the user via these constituent elements, generates an operating signal, and outputs the generated operating signal to the control block 910.

The bus 912 interconnects the tuner 902, the demultiplexer 903, the decoder 904, the video signal processing block 905, the audio signal processing block 907, the external interface 909, and the control block 910.

In the thus configured television device 90, the decoder 904 has the functions of the image decoding device 50 according to the foregoing embodiment. A range to which to apply the deblocking filter can be thereby determined more appropriately at a time of decoding an image in the television device 90, so that image quality can be improved.

7-2. Second Example of Application

Figure 14:
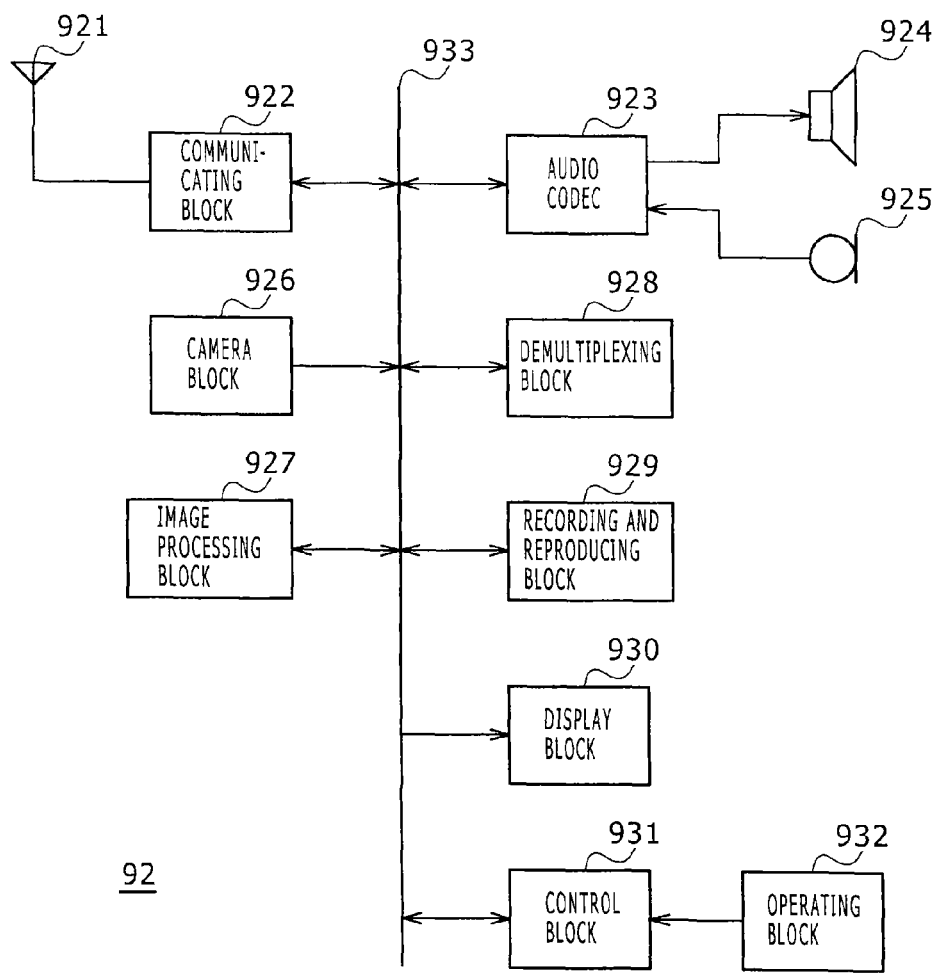
FIG. 14 is a diagram illustrating a schematic configuration of a portable telephone.

FIG. 14 shows an example of a schematic configuration of a portable telephone to which the foregoing embodiment is applied. A portable telephone 920 includes an antenna 921, a communicating block 922, an audio codec 923, a speaker 924, a microphone 925, a camera block 926, an image processing block 927, a demultiplexing block 928, a recording and reproducing block 929, a display block 930, a control block 931, an operating block 932, and a bus 933.

The antenna 921 is connected to the communicating block 922. The speaker 924 and the microphone 925 are connected to the audio codec 923. The operating block 932 is connected to the control block 931. The bus 933 interconnects the communicating block 922, the audio codec 923, the camera block 926, the image processing block 927, the demultiplexing block 928, the recording and reproducing block 929, the display block 930, and the control block 931.

The portable telephone 920 performs operations such as transmitting and receiving audio signals, transmitting and receiving electronic mails or image data, taking an image, recording data, and the like in various operation modes including a voice call mode, a data communication mode, a photographing mode, and a videophone mode.

In the voice call mode, an analog audio signal generated by the microphone 925 is supplied to the audio codec 923. The audio codec 923 converts the analog audio signal into audio data, subjects the converted audio data to A/D conversion, and compresses the audio data. The audio codec 923 then outputs the audio data after the compression to the communicating block 922. The communicating block 922 subjects the audio data to coding and modulation to generate a transmission signal. The communicating block 922 then transmits the generated transmission signal to a base station (not shown) via the antenna 921. In addition, the communicating block 922 subjects a radio signal received via the antenna 921 to amplification and frequency conversion to obtain a received signal. Then, the communicating block 922 generates audio data by demodulating and decoding the received signal, and outputs the generated audio data to the audio codec 923. The audio codec 923 decompresses the audio data and subjects the audio data to D/A conversion to generate an analog audio signal. The audio codec 923 then supplies the generated audio signal to the speaker 924 to make audio output.

In addition, in the data communication mode, for example, the control block 931 generates text data constituting an electronic mail according to operation by the user via the operating block 932. The control block 931 also makes the text displayed on the display block 930. In addition, the control block 931 generates electronic mail data according to a transmission instruction from the user via the operating block 932, and outputs the generated electronic mail data to the communicating block 922. The communicating block 922 subjects the electronic mail data to coding and modulation to generate a transmission signal. The communicating block 922 then transmits the generated transmission signal to the base station (not shown) via the antenna 921. The communicating block 922 also subjects a radio signal received via the antenna 921 to amplification and frequency conversion to obtain a received signal. Then, the communicating block 922 reconstructs electronic mail data by demodulating and decoding the received signal, and outputs the reconstructed electronic mail data to the control block 931. The control block 931 makes the contents of the electronic mail displayed on the display block 930, and makes the electronic mail data stored on a storage medium of the recording and reproducing block 929.

The recording and reproducing block 929 has an arbitrary readable and writable storage medium. For example, the storage medium may be a storage medium of a built-in type such as a RAM, a flash memory, or the like, or may be a storage medium of an external loading type such as a hard disk, a magnetic disk, a magneto-optical disk, an optical disk, a USB memory, a memory card, or the like.

In addition, in the photographing mode, for example, the camera block 926 generates image data by imaging a subject, and outputs the generated image data to the image processing block 927. The image processing block 927 codes the image data input from the camera block 926, and makes a coded stream stored on the storage medium of the recording and reproducing block 929.

In addition, in the videophone mode, for example, the demultiplexing block 928 multiplexes a video stream coded by the image processing block 927 and an audio stream input from the audio codec 923, and outputs the multiplexed stream to the communicating block 922. The communicating block 922 subjects the stream to coding and modulation to generate a transmission signal. The communicating block 922 then transmits the generated transmission signal to the base station (not shown) via the antenna 921. The communicating block 922 also subjects a radio signal received via the antenna 921 to amplification and frequency conversion to obtain a received signal. The transmission signal and the received signal can include a coded bit stream. Then, the communicating block 922 reconstructs a stream by demodulating and decoding the received signal, and outputs the reconstructed stream to the demultiplexing block 928. The demultiplexing block 928 separates a video stream and an audio stream from the input stream, and outputs the video stream to the image processing block 927 and the audio stream to the audio codec 923. The image processing block 927 decodes the video stream to generate video data. The video data is supplied to the display block 930. The display block 930 displays a series of images. The audio codec 923 decompresses the audio stream and subjects the audio stream to D/A conversion to generate an analog audio signal. The audio codec 923 then supplies the generated audio signal to the speaker 924 to make audio output.

In the thus configured portable telephone 920, the image processing block 927 has the functions of the image coding device 10 and the image decoding device 50 according to the foregoing embodiment. A range to which to apply the deblocking filter can be thereby determined more appropriately at times of coding and decoding an image in the portable telephone 920, so that image quality can be improved.

7-3. Third Example of Application

Figure 15:
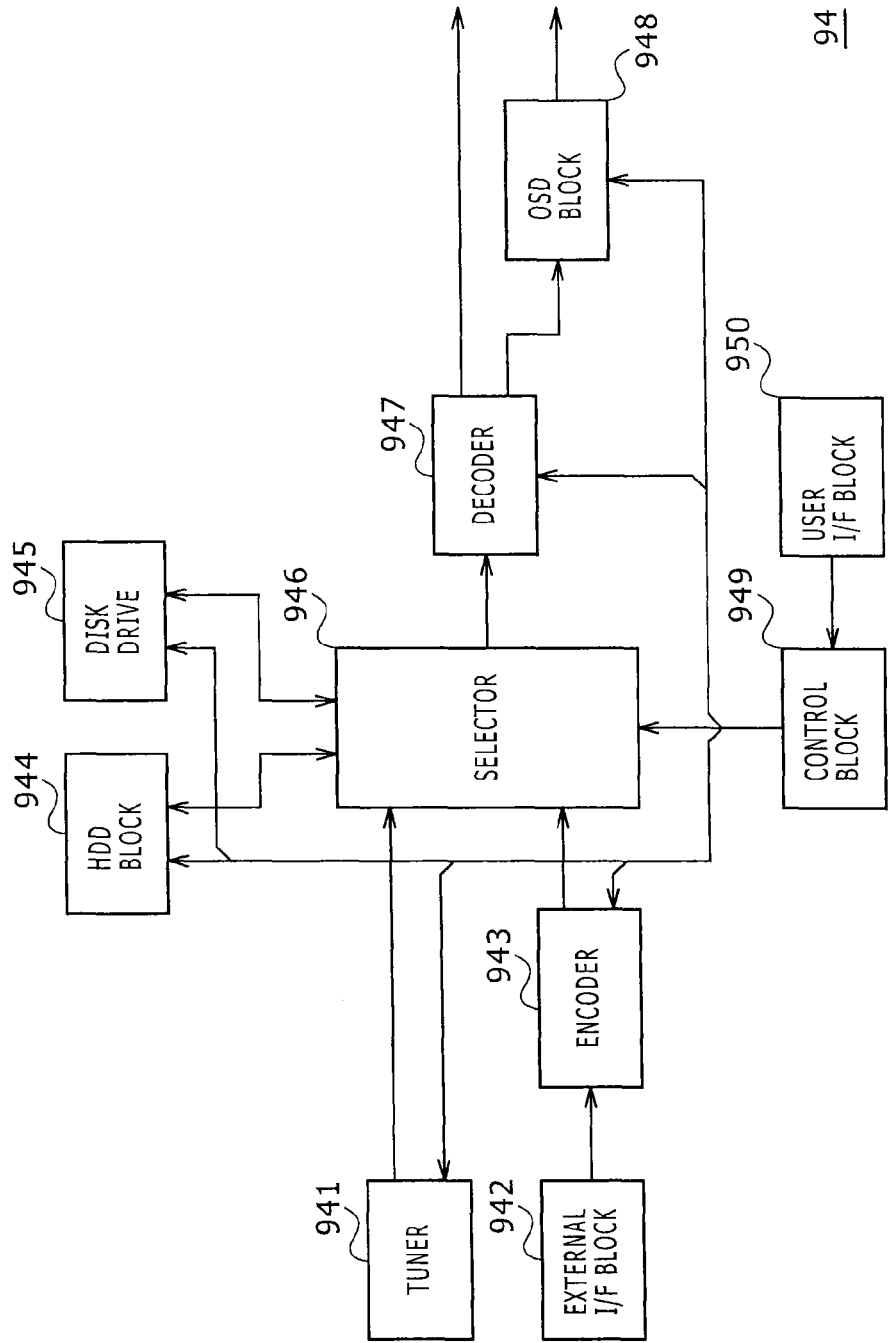
FIG. 15 is a diagram illustrating a schematic configuration of a recording and reproducing device.

FIG. 15 shows an example of a schematic configuration of a recording and reproducing device to which the foregoing embodiment is applied. A recording and reproducing device 940 for example codes audio data and video data of a received broadcast program and records the audio data and the video data on a recording medium. In addition, the recording and reproducing device 940 may for example code audio data and video data obtained from another device and record the audio data and the video data on the recording medium. In addition, the recording and reproducing device 940 for example reproduces data recorded on the recording medium on a monitor and a speaker according to an instruction from a user. At this time, the recording and reproducing device 940 decodes audio data and video data.

The recording and reproducing device 940 includes a tuner 941, an external interface 942, an encoder 943, an HDD (Hard Disk Drive) 944, a disk drive 945, a selector 946, a decoder 947, an OSD (On-Screen Display) 948, a control block 949, and a user interface 950.

The tuner 941 extracts a signal of a desired channel from a broadcast signal received via an antenna (not shown), and demodulates the extracted signal. The tuner 941 then outputs a coded bit stream obtained by the demodulation to the selector 946. That is, the tuner 941 has a function as transmitting means in the recording and reproducing device 940.

The external interface 942 is an interface for connecting the recording and reproducing device 940 with an external device or a network. The external interface 942 may be for example an IEEE 1394 interface, a network interface, a USB interface, a flash memory interface, or the like. For example, video data and audio data received via the external interface 942 is input to the encoder 943. That is, the external interface 942 has a function as transmitting means in the recording and reproducing device 940.

The encoder 943 codes the video data and the audio data input from the external interface 942 when the video data and the audio data are not coded. The encoder 943 then outputs a coded bit stream to the selector 946.

The HDD 944 records a coded bit stream having the content data of video, audio, and the like compressed therein, various kinds of programs, and other data on an internal hard disk. The HDD 944 also reads these pieces of data from the hard disk at a time of reproduction of the video and the audio.

The disk drive 945 records and reads data on and from a recording medium loaded therein. The recording medium loaded in the disk drive 945 may be for example a DVD disk (a DVD-Video, a DVD-RAM, a DVD-R, a DVD-RW, a DVD+R, a DVD+RW, or the like), a Blu-ray (registered trademark) disk, or the like.

At a time of recording of video and audio, the selector 946 selects the coded bit stream input from the tuner 941 or the encoder 943, and outputs the selected coded bit stream to the HDD 944 or the disk drive 945. In addition, at a time of reproduction of video and audio, the selector 946 outputs the coded bit stream input from the HDD 944 or the disk drive 945 to the decoder 947.

The decoder 947 decodes the coded bit stream, and generates video data and audio data. The decoder 947 then outputs the generated video data to the OSD 948. In addition, the decoder 904 outputs the generated audio data to an external speaker.

The OSD 948 reproduces the video data input from the decoder 947, and displays video. The OSD 948 may also superimpose for example a GUI image of a menu, a button, a cursor, or the like on the displayed video.

The control block 949 has a processor such as a CPU and a memory such as a RAM and a ROM. The memory stores a program executed by the CPU, program data, and the like. The program stored by the memory is, for example, read and executed by the CPU at a time of starting the recording and reproducing device 940. By executing the program, the CPU controls the operation of the recording and reproducing device 940 according to an operating signal input from the user interface 950, for example.

The user interface 950 is connected to the control block 949. The user interface 950 has, for example, a button and a switch for a user to operate the recording and reproducing device 940, a portion for receiving a remote control signal, and the like. The user interface 950 detects an operation by the user via these constituent elements, generates an operating signal, and outputs the generated operating signal to the control block 949.

In the thus configured recording and reproducing device 940, the encoder 943 has the functions of the image coding device 10 according to the foregoing embodiment. In addition, the decoder 947 has the functions of the image decoding device 50 according to the foregoing embodiment. A range to which to apply the deblocking filter can be thereby determined more appropriately at times of coding and decoding an image in the recording and reproducing device 940, so that image quality can be improved.

7-4. Fourth Example of Application

Figure 16:
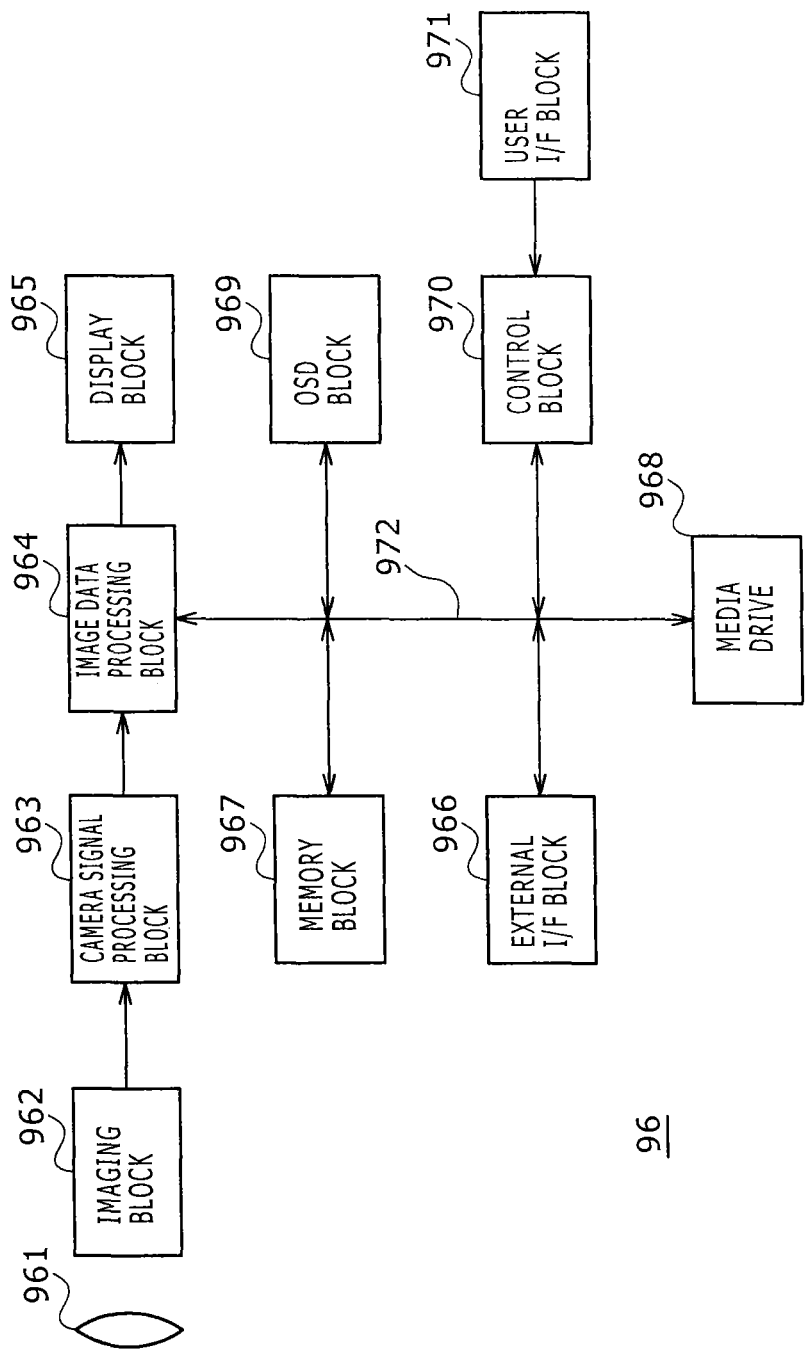
FIG. 16 is a diagram illustrating a schematic configuration of an imaging device.

FIG. 16 shows an example of a schematic configuration of an imaging device to which the foregoing embodiment is applied. An imaging device 960 generates an image by imaging a subject, codes image data, and records the image data on a recording medium.

The imaging device 960 includes an optical block 961, an imaging block 962, a signal processing block 963, an image processing block 964, a display block 965, an external interface 966, a memory 967, a media drive 968, an OSD 969, a control block 970, a user interface 971, and a bus 972.

The optical block 961 is connected to the imaging block 962. The imaging block 962 is connected to the signal processing block 963. The display block 965 is connected to the image processing block 964. The user interface 971 is connected to the control block 970. The bus 972 interconnects the image processing block 964, the external interface 966, the memory 967, the media drive 968, the OSD 969, and the control block 970.

The optical block 961 has a focusing lens, a diaphragm mechanism, and the like. The optical block 961 forms an optical image of a subject on an imaging surface of the imaging block 962. The imaging block 962 has a CCD or CMOS image sensor or the like. The imaging block 962 converts the optical image formed on the imaging surface into an image signal as an electric signal by photoelectric conversion. The imaging block 962 then outputs the image signal to the signal processing block 963.

The signal processing block 963 subjects the image signal input from the imaging block 962 to various camera signal processing such as knee correction, gamma correction, color correction, and the like. The signal processing block 963 outputs image data after the camera signal processing to the image processing block 964.

The image processing block 964 codes the image data input from the signal processing block 963 to generate coded data. The image processing block 964 then outputs the generated coded data to the external interface 966 or the media drive 968. The image processing block 964 also decodes coded data input from the external interface 966 or the media drive 968 to generate image data. The image processing block 964 then outputs the generated image data to the display block 965. The image processing block 964 may also output the image data input from the signal processing block 963 to the display block 965 to display the image. The image processing block 964 may also superimpose data for display which data is obtained from the OSD 969 on the image output to the display block 965.

The OSD 969 generates for example a GUI image of a menu, a button, a cursor, or the like, and outputs the generated image to the image processing block 964.

The external interface 966 is configured as a USB input-output terminal, for example. The external interface 966 connects the imaging device 960 to a printer at a time of printing of an image, for example. In addition, the external interface 966 is connected with a drive as required. A removable medium such as a magnetic disk or an optical disk, for example, is loaded into the drive. A program read from the removable medium can be installed on the imaging device 960. Further, the external interface 966 may be configured as a network interface connected to a network such as a LAN, the Internet, or the like. That is, the external interface 966 has a function as transmitting means in the imaging device 960.

A recording medium loaded into the media drive 968 may be an arbitrary readable and writable removable medium such as a magnetic disk, a magneto-optical disk, an optical disk, or a semiconductor memory, for example. In addition, a recording medium may be mounted in the media drive 968 in a fixed manner to form a nonportable storage portion such as a built-in type hard disk drive or an SSD (Solid State Drive), for example.

The control block 970 has a processor such as a CPU and a memory such as a RAM and a ROM. The memory stores a program executed by the CPU, program data, and the like. The program stored by the memory is, for example, read and executed by the CPU at a time of starting the imaging device 960. By executing the program, the CPU controls the operation of the imaging device 960 according to an operating signal input from the user interface 971, for example.

The user interface 971 is connected to the control block 970. The user interface 971 has, for example, a button and a switch for a user to operate the imaging device 960, and the like. The user interface 971 detects an operation by the user via these constituent elements, generates an operating signal, and outputs the generated operating signal to the control block 970.

In the thus configured imaging device 960, the image processing block 964 has the functions of the image coding device 10 and the image decoding device 50 according to the foregoing embodiment. A range to which to apply the deblocking filter can be thereby determined more appropriately at times of coding and decoding an image in the imaging device 960, so that image quality can be improved.

Further, the present technology should not be construed as being limited to the foregoing embodiments. The embodiments disclose the present technology in an illustrative form. It is obvious that modifications and substitutions in the embodiments can be made by those skilled in the art without departing from the spirit of the present technology. That is, in order to determine the spirit of the present technology, claims are to be considered.

Incidentally, the present technology can also adopt the following constitutions.

(1) An image processing device including:

a decoding section for decoding image data coded in each block;

a filter for applying filtering for removing block distortion to the decoded image data decoded by the decoding section; and a filter setting section for setting, according to block sizes of adjacent blocks adjacent at a block boundary, a tap length of the filtering for the block boundary or a filtering object pixel range as an object of the filtering.

(2) The image processing device according to (1), wherein the filter setting section sets the tap length to an extended length when at least one of the adjacent blocks is extended to a size larger than a predetermined block size.

(3) The image processing device according to (2), wherein the filter setting section sets the tap length of the filter longer as the block size of the adjacent block is increased.

(4) The image processing device according to any one of (1) to (3), wherein the filter setting section sets the filtering object pixel range to an extended width when at least one of the adjacent blocks is extended to a size larger than the predetermined block size.

(5) The image processing device according to any one of (1) to (4), wherein the filter setting section sets the filtering object pixel range wider as the block size of the adjacent block is increased.

(6) The image processing device according to any one of (1) to (5), wherein the filter setting section sets a value of block boundary strength data used for the filtering to an extended value when at least one of the adjacent blocks is extended to a size larger than the predetermined block size.

(7) The image processing device according to (6), wherein the filter setting section sets the value of the block boundary strength data used for the filtering larger as the block size of the adjacent block is increased.

(8) The image processing device according to any one of (1) to (7), wherein the filter setting section sets the tap length of the filtering or the filtering object pixel range according to the block sizes on adjacent sides of the adjacent blocks.

(9) The image processing device according to any one of (1) to (8), wherein the filter setting section sets the tap length of the filtering and the filtering object pixel range according to case classification corresponding to the block sizes of the adjacent blocks.

(10) The image processing device according to (9), wherein the case classification is a case where the adjacent blocks both have a predetermined block size or smaller and a case where at least one of the adjacent blocks is extended to a size larger than the predetermined block size.

(11) The image processing device according to (10), wherein the filter setting section performs the case classification into a case where the adjacent blocks are 16×16 pixels or smaller, a case where at least one of the two blocks is larger than 16×16 pixels and both are 32×32 pixels or smaller, and a case where at least one of the two blocks is larger than 32×32 pixels.

(12) The image processing device according to any one of (1) to (11), wherein the block sizes are prediction block sizes as processing units when intra prediction or inter prediction is performed.

(13) The image processing device according to any one of (1) to (12), wherein the block sizes are transform sizes as processing units when an orthogonal transform is performed.

(14) The image processing device according to any one of (2) to (13), wherein the predetermined block size is a macroblock size of an H.264/AVC standard.

(15) The image processing device according to any one of (1) to (14), wherein the filter setting section sets the tap length or the filtering object pixel range according to whether the decoded image data is image data for generating a predictive image or image data for image display.

Industrial Applicability

The image processing device and the image processing method according to the present technology can provide an image of excellent image quality with a reduced block distortion. The present technology is therefore suitable for image coding devices, image decoding devices, and the like used when image information (bit stream) obtained by performing coding in block units as in MPEG, H.26×, and the like is transmitted and received via network media such as satellite broadcasting, cable TV, the Internet, portable telephones, and the like or when the image information is processed on storage media such as optical and magnetic disks, flash memories, and the like.

EXPLANATION OF REFERENCE NUMERALS

10 ... Image coding device, 11 ... A/D converting section, 12, 57 ... Picture rearrangement buffer, 13 ... Subtracting section, 14 ... Orthogonal transform section, 15 ... Quantizing section, 16 ... Lossless coding section, 17, 51 ... Storage buffer, 18 ... Rate controlling section, 21, 53 ... Dequantizing section, 22, 54 ... Inverse orthogonal transform section, 23, 55 ... Adding section, 24, 56 ... Deblocking filter, 25, 61 ... Frame memory, 26, 62, 65 ... Selector, 31, 63 ... Intra prediction section, 32 ... Motion prediction and compensation section, 33 ... Predictive image and optimum mode selecting section, 41, 71 ... Filter setting section, 50 ... Image decoding device, 52 ... Lossless decoding section, 58 ... D/A converting section, 64 ... Motion compensation section, 90 ... Television device, 92 ... Portable telephone, 94 ... Recording and reproducing device, 96 ... Imaging device, 241 ... Filter strength determining portion, 242 ... Filtering portion, 411 ... Block size buffer, 412 ... Parameter value generating portion, 901, 921 ... Antenna, 902, 941 ... Tuner, 903 ... Demultiplexer, 904, 947 ... Decoder, 905 ... Video signal processing block, 906 ... Display block, 907 ... Audio signal processing block, 908 ... Speaker, 909, 942, 966 ... External interface block, 910, 931, 949, 970 ... Control block, 911, 932, 971 ... User interface block, 912, 933, 972 ... Bus, 922 ... Communicating block, 923 ... Audio codec, 924 ... Speaker, 925 ... Microphone, 926 ... Camera block, 927 ... Image processing block, 928 ... Demultiplexing block, 929 ... Recording and reproducing block, 930 ... Display block, 943 ... Encoder, 944 ... HDD block, 945 ... Disk drive, 948, 969 ... OSD block, 961 ... Optical block, 962 ... Imaging block, 963 ... Camera signal processing block, 964 ... Image data processing block, 965 ... Display block, 967 ... Memory block, 968 ... Media drive

The invention claimed is:

1. An image processing device comprising:
circuitry configured to:
set, according to a transform block size at a transform block boundary, at least one of a tap length of filtering for the transform block boundary and a filtering range;
apply the filtering to decoded image data according to at least one of the tap length and the filtering range to generate filtered image data; and
encode image data using the filtered image data.

2. The image processing device according to claim 1, wherein the circuitry is configured to set, according to transform block sizes of adjacent transform blocks adjacent to each other at the transform block boundary, at least one of the tap length of the filtering for the transform block boundary and the filtering range.

3. The image processing device according to claim 2, wherein, when the transform block sizes on adjacent sides of the adjacent transform blocks are extended transform block sizes larger than a predetermined transform block size, the circuitry is configured to set the at least one of the tap length longer than a tap length set at the predetermined transform block size and the filtering range wider than a filtering range set at the predetermined transform block size.

4. The image processing device according to claim 2, wherein, when a transform block of the adjacent transform blocks is extended to a size larger than the predetermined transform block size, the circuitry is configured to set a value of transform block boundary strength data used for the filtering larger than a value set at the predetermined transform block size.

5. The image processing device according to claim 2, wherein the transform block sizes are prediction transform block sizes as processing units when at least one of intra prediction and inter prediction is performed.

6. The image processing device according to claim 4, wherein the predetermined transform block size is a macroblock size of an H.264/AVC standard.

7. The image processing device according to claim 2, wherein the circuitry is configured to set the at least one of the tap length of the filtering and the filtering range according to the transform block sizes on adjacent sides of the adjacent transform blocks.

8. The image processing device according to claim 2, wherein the circuitry is configured to set the at least one of the tap length of the filtering and the filtering object pixel range according to the transform block sizes on unadjacent sides of the adjacent transform blocks.

9. The image processing device according to claim 2, wherein the adjacent transform blocks are non-square transform blocks.

10. An image processing method comprising:
setting, via circuitry of an image processing device and according to a transform block size at a transform block boundary, at least one of a tap length of filtering for the transform block boundary and a filtering range;
applying, via the circuitry, the filtering to decoded image data according to at least one of the tap length and the filtering range to generate filtered image data; and
encoding, via the circuitry, image data using the filtered image data.

11. The image processing method according to claim 10, wherein the setting includes setting, via the circuitry and according to transform block sizes of adjacent transform blocks adjacent to each other at the transform block boundary, at least one of the tap length of the filtering for the transform block boundary and the filtering range.

12. The image processing method according to claim 11, wherein the setting includes setting, via the circuitry, the at least one of the tap length longer than a tap length set at the predetermined transform block size and the filtering range wider than a filtering range set at the predetermined transform block size when the transform block sizes on adjacent sides of the adjacent transform blocks are extended transform block sizes larger than a predetermined transform block size.

13. The image processing method according to claim 11, further comprising setting, via the circuitry, a value of transform block boundary strength data used for the filtering larger than a value set at the predetermined transform block size when a transform block of the adjacent transform blocks is extended to a size larger than the predetermined transform block size.

14. The image processing method according to claim 11, wherein the transform block sizes are prediction transform block sizes as processing units when at least one of intra prediction and inter prediction is performed.

15. The image processing method according to claim 13, wherein the predetermined transform block size is a macroblock size of an H.264/AVC standard.

16. The image processing method according to claim 11, wherein the setting includes setting, via the circuitry, the at least one of the tap length of the filtering and the filtering range according to the transform block sizes on adjacent sides of the adjacent transform blocks.

17. The image processing method according to claim 11, wherein the setting includes setting, via the circuitry, the at least one of the tap length of the filtering and the filtering object pixel range according to the transform block sizes on unadjacent sides of the adjacent transform blocks.

18. The image processing method according to claim 11, wherein the adjacent transform blocks are non-square transform blocks.

* * * * *